(12) United States Patent
Fujisawa et al.

(10) Patent No.: US 10,938,499 B2
(45) Date of Patent: Mar. 2, 2021

(54) OPTICAL PATH CONTROLLER AND METHOD OF CONTROLLING OPTICAL PATH

(71) Applicant: NEC Corporation, Tokyo (JP)

(72) Inventors: Shinsuke Fujisawa, Tokyo (JP); Akio Tajima, Tokyo (JP); Hitoshi Takeshita, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 16/625,873

(22) PCT Filed: Jul. 6, 2017

(86) PCT No.: PCT/JP2017/024755
§ 371 (c)(1),
(2) Date: Dec. 23, 2019

(87) PCT Pub. No.: WO2019/008718
PCT Pub. Date: Jan. 10, 2019

(65) Prior Publication Data
US 2020/0136743 A1 Apr. 30, 2020

(51) Int. Cl.
*H04J 14/00* (2006.01)
*H04J 14/02* (2006.01)
(Continued)

(52) U.S. Cl.
CPC .......... *H04J 14/0267* (2013.01); *H04L 45/62* (2013.01); *H04Q 11/0062* (2013.01)

(58) Field of Classification Search
CPC .......... H04Q 11/0062; H04Q 11/0066; H04Q 11/0067; H04J 14/02; H04J 14/0227;
(Continued)

(56) References Cited

U.S. PATENT DOCUMENTS

| 7,716,271 | B1* | 5/2010 | Bertsekas | H04J 14/0257 709/200 |
| 2013/0216226 | A1* | 8/2013 | Hirano | H04L 45/62 398/51 |
| 2018/0062783 | A1* | 3/2018 | Mansouri Rad | H04J 14/021 |

FOREIGN PATENT DOCUMENTS

| JP | 2000-517494 A | 12/2000 |
| JP | 2002-078128 A | 3/2002 |

(Continued)

OTHER PUBLICATIONS

International Search Report in the corresponding PCT International Application dated Oct. 10, 2017 and Form PCT/ISA/237 (English version).

*Primary Examiner* — Hanh Phan
(74) *Attorney, Agent, or Firm* — Finnegan, Henderson, Farabow, Garrett & Dunner, L.L.P.

(57) ABSTRACT

It is difficult in the elastic optical network to achieve a balance between the improvement in the frequency utilization efficiency and the increase in the probability of opening an optical path; therefore, an optical path controller according to an exemplary aspect of the present invention includes route selection means for searching for a route candidate being a candidate for a route to accommodate an optical path, and selecting a best possible route with a minimum route selection index serving as an index for route search; use rate collecting means for collecting a use rate serving as an index to indicate a usage condition of an optical frequency band in an optical fiber transmission line included in the route candidate; and route selection index judgment means for determining the route selection index based on the use rate.

17 Claims, 21 Drawing Sheets

(51) Int. Cl.
*H04L 12/721* (2013.01)
*H04Q 11/00* (2006.01)

(58) Field of Classification Search
CPC .............. H04J 14/0267; H04J 14/0256; H04B 10/0795; H04B 10/07953; H04B 10/27; H04L 45/62; H04L 45/28; H04L 45/24
USPC ........ 398/45, 48, 49, 51, 53, 56, 57, 79, 33, 398/38, 25, 26, 27; 370/216, 218, 225, 370/228, 254, 352, 389, 392, 468
See application file for complete search history.

(56) References Cited

FOREIGN PATENT DOCUMENTS

| | | |
|---|---|---|
| JP | 2007-311900 A | 11/2007 |
| JP | 2012-070256 A | 4/2012 |
| JP | 2017-073693 A | 4/2017 |

\* cited by examiner

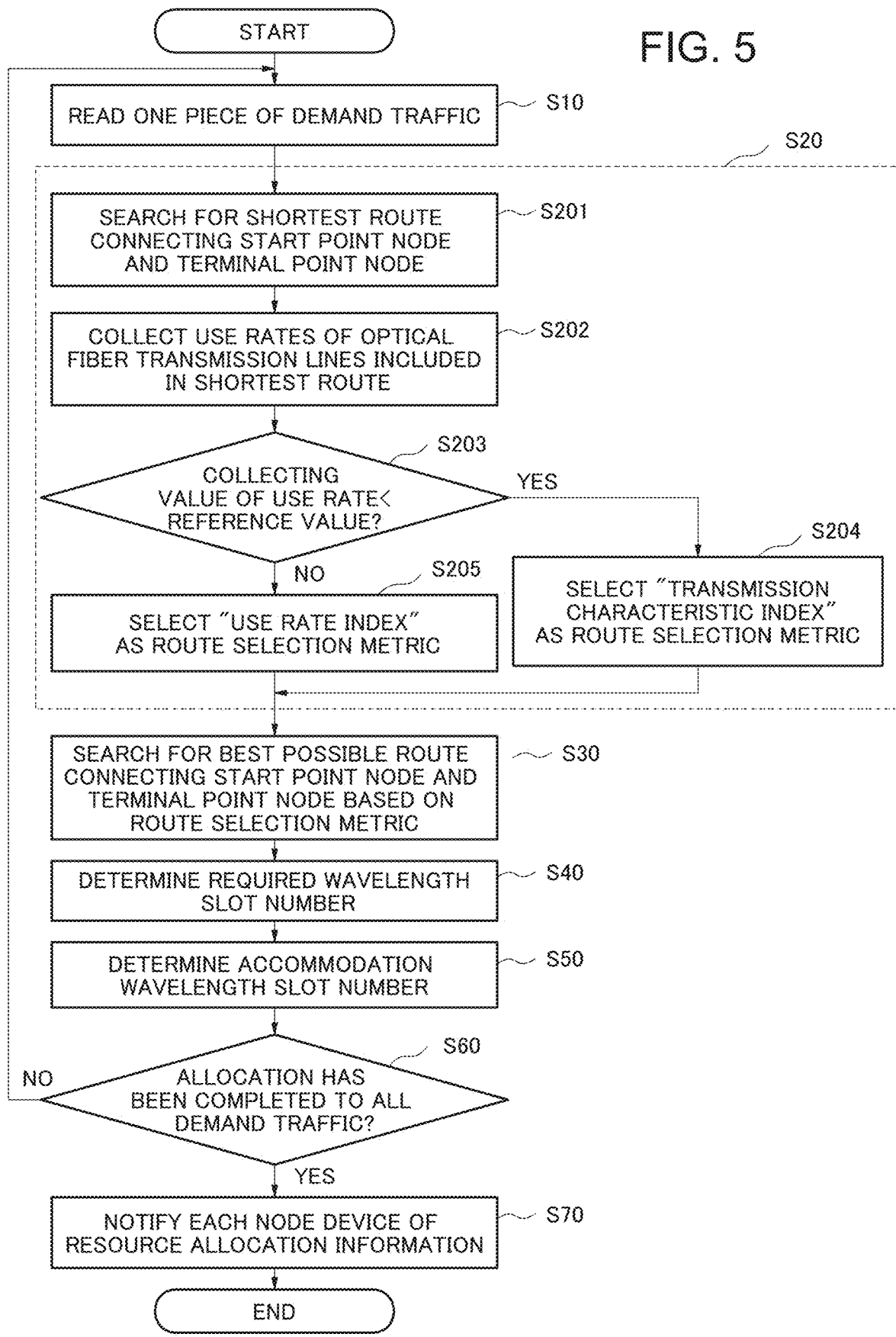

| OPTICAL FIBER TRANSMISSION LINE ID | USE RATE |
|---|---|
| E1-E2 | 70% |
| E2-E7 | 78% |
| E7-E8 | 51% |

WAVELENGTH SLOT NUMBER

WAVELENGTH SLOT NUMBER

OPTICAL PATH CONTROLLER AND METHOD OF CONTROLLING OPTICAL PATH

CROSS-REFERENCE TO RELATED PATENT APPLICATIONS

This application is a National Stage Entry of International Application No. PCT/JP2017/024755, filed Jul. 6, 2017. The entire contents of the above-referenced application is expressly incorporated herein by reference.

TECHNICAL FIELD

The present invention relates to optical path controllers and methods of controlling optical path and, in particular, to an optical path controller and a method of controlling optical path that use an elastic optical network system.

BACKGROUND ART

An optical network provides the functionality of communicating demand traffic through optical fiber communication channels among base points. In the optical network, large-capacity signal light in which demand traffic from clients is multiplexed using various multiplexing systems is communicated through the optical fiber communication channels. The multiplexing systems include a wavelength division multiplexing (WDM) system and a time division multiplexing (TDM) system.

In recent years, it becomes possible in the optical network to accommodate 100 Giga bit per second (Gbps) class traffic per optical path and communicate large-capacity traffic up to 10 Tera bit per second (Tbps) class by the wavelength division multiplexing system.

Patent Literature 1 discloses an example of technologies for improving frequency utilization efficiency of an optical path in such an optical network.

A related network management device described in Patent Literature 1 has the function of setting and managing optical paths and is composed of a control unit, a traffic accommodation design unit, a storage unit, an input unit, and a path allocation unit. The storage unit stores a traffic pattern database (DB), a physical topology DB, and a path allocation information DB. The traffic accommodation design unit is composed of a route extraction unit, a required frequency slot determination unit, and a usage fiber/usage frequency slot number determination unit.

The route extraction unit extracts any one of traffic patterns from the traffic pattern DB, performs whole route search on a target optical path based on a start point and a terminal point of the traffic pattern, and stores a reachable route and a hop count in a memory. The required frequency slot determination unit takes an optical path route with the smallest hop count from optical path routes searched by the route extraction unit, and determines an optimum value of a slot number corresponding to the hop count. Next, the usage fiber/usage frequency slot number determination unit determines, with reference to the physical topology DB and path allocation information 133, whether each of a plurality of fiber sections constituting the determined optical path route is enabled. If all the fiber sections are enabled, a path allocation unit 1 secures a combination of those sections for the optical path and updates the contents of the path allocation DB.

It is said that, according to the related network management device, the above-described configuration makes it possible to select an optimum frequency slot number depending on the degradation of optical signal quality in an optical path route and improve the efficiency in the use of the optical frequency band.

The related technologies include technologies described in Patent Literature 2 and Patent Literature 3.

CITATION LIST

Patent Literature

PTL 1: Japanese Unexamined Patent Application Publication No. 2012-070256
PTL 2: Japanese Unexamined Patent Application Publication No. 2002-078128
PTL 3: Japanese Unexamined Patent Application Publication (Translation of PCT Application) No. 2000-517494

SUMMARY OF INVENTION

Technical Problem

As mentioned above, in the optical path network (elastic optical network) described in Patent Literature 1, the number of allocated wavelength slots of the optical path is changed depending on the demand traffic capacity and the transmission characteristics of the optical fiber transmission line on the optical path allocation route. This improves the frequency utilization efficiency compared to the optical path in a fixed grid network.

That is to say, the frequency utilization efficiency of the optical path in the elastic optical network is variable depending on the transmission characteristics of the optical path route. This makes it possible to maximize the frequency utilization efficiency by selecting a route with the best transmission characteristics, and minimize the number of required wavelength slots.

However, not every route with the best transmission characteristics has unused wavelength slots exceeding the number of required wavelength slots. This is because a fragmentary unused area arises which causes fragmentation of optical frequency bands when it is repeated to add, change, or delete an optical path following the variation in the demand traffic. When the fragmentation of the optical frequency bands arises, it becomes difficult to secure continuous unused wavelength slots exceeding the number of required wavelength slots, which causes a probability of opening an optical path (optical path opening success probability) to decrease. Particularly, in the elastic optical network, the number of required wavelength slots differs with respect to each optical path. This makes pronounced the event that the optical path opening success probability decreases due to the fragmentation of optical frequency bands.

In this case, it is possible to prevent the optical path opening success probability from decreasing, using a use rate of an optical frequency band as an index characterizing fragmentation of the optical frequency band with respect to each optical fiber transmission line, by allocating an optical path to a route with the minimum use rate. On the other hand, the route with the minimum use rate is not always the shortest route; accordingly, the transmission characteristics are generally degraded as compared to the transmission characteristics of the shortest route. In this case, there is a possibility that the frequency utilization efficiency decreases, because it is necessary to increase a frequency band occupied by an optical path with the same capacity. In other words, the improvement in the frequency utilization efficiency and the increase in the probability of opening an optical path do not always go together.

As described above, there has been the problem that it is difficult in the elastic optical network to achieve a balance between the improvement in the frequency utilization efficiency and the increase in the probability of opening an optical path.

An object of the present invention is to provide an optical path controller and a method of controlling optical path that solve the above-mentioned problem that it is difficult in the elastic optical network to achieve a balance between the improvement in frequency utilization efficiency and the increase in a probability of opening an optical path.

Solution to Problem

An optical path controller according to an exemplary aspect of the present invention includes route selection means for searching for a route candidate being a candidate for a route to accommodate an optical path, and selecting a best possible route with a minimum route selection index serving as an index for route search; use rate collecting means for collecting a use rate serving as an index to indicate a usage condition of an optical frequency band in an optical fiber transmission line included in the route candidate; and route selection index judgment means for determining the route selection index based on the use rate.

A method of controlling optical path according to an exemplary aspect of the present invention includes searching for a route candidate being a candidate for a route to accommodate an optical path, and selecting a best possible route with a minimum route selection index serving as an index for route search; collecting a use rate serving as an index to indicate a usage condition of an optical frequency band in an optical fiber transmission line included in the route candidate; and determining the route selection index based on the use rate.

Advantageous Effects of Invention

According to the optical path controller and the method of controlling optical path of the present invention, in the elastic optical network, it is possible to prevent a probability of opening an optical path from decreasing, with improving frequency utilization efficiency.

BRIEF DESCRIPTION OF DRAWINGS

FIG. 5 is a flowchart to explain an operation of the optical path controller and a method of controlling optical path according to the second example embodiment of the present invention.

EXAMPLE EMBODIMENT

Example embodiments of the present invention will be described below with reference to the drawings.

First Example Embodiment

Figure 1:
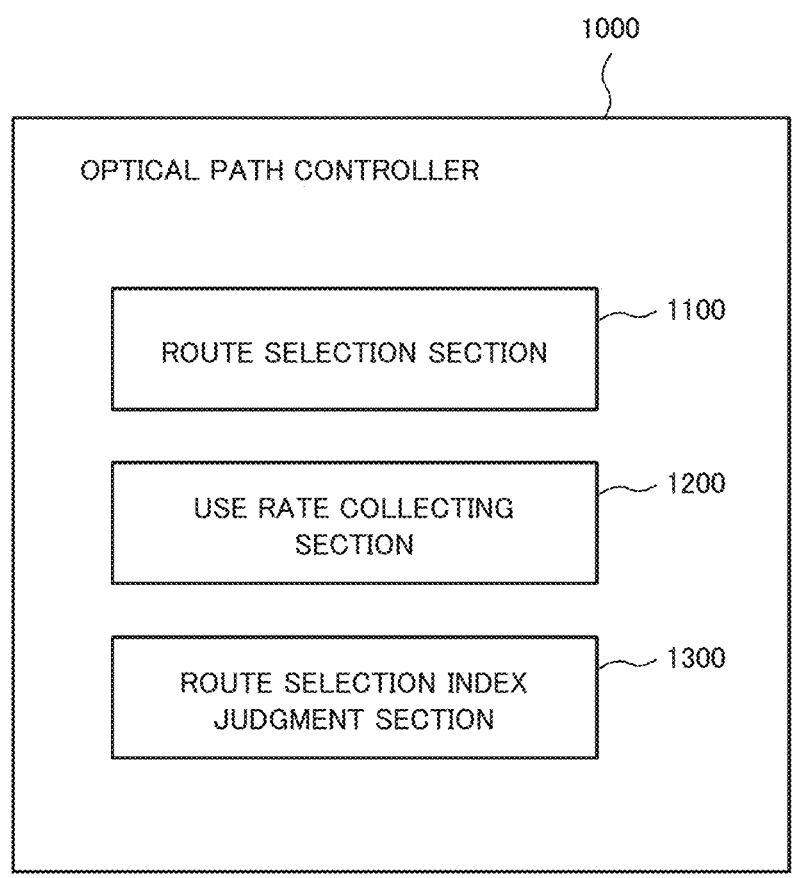
FIG. 1 is a block diagram illustrating a configuration of an optical path controller according to a first example embodiment of the present invention.

FIG. 1 is a block diagram illustrating a configuration of an optical path controller 1000 according to a first example embodiment of the present invention. The optical path controller 1000 includes a route selection section (route selection means) 1100, a use rate collecting section (use rate collecting means) 1200, and a route selection index judgment section (route selection index judgment means) 1300.

The route selection unit 1100 searches for a route candidate being a candidate for a route to accommodate an optical path, and selects best possible route with a minimum route selection index serving as an index for route search. The use rate collecting section 1200 collects a use rate serving as an index to indicate a usage condition of an optical frequency band in an optical fiber transmission line included in the route candidate. The route selection index judgment section 1300 determines the route selection index based on the use rate.

As described above, the optical path controller 1000 according to the present example embodiment is configured to select the route selection index based on the use rate of the optical frequency band in the optical fiber transmission line, and perform route search using the selected route selection index. Consequently, it becomes possible to prevent a probability of opening an optical path from decreasing, by selecting the route selection index so as to perform the route search giving the use rate priority when the use rate of the optical frequency band is large. On the other hand, when the use rate of the optical frequency band is small, it is possible to improve the frequency utilization efficiency by selecting the route selection index so as to perform the route search giving the transmission characteristics priority.

The route selection index judgment section 1300 can be configured to select any one of a transmission characteristic index and a use rate index as the route selection index, based on a result obtained by comparing a value acquired by collecting the use rate with a predetermined reference value. The transmission characteristic index is an index indicating transmission characteristics of the route candidate. The use rate index is an index based on the use rate.

Next, a method of controlling optical path according to the present example embodiment will be described.

In the method of controlling optical path according to the present example embodiment, first, a route candidate being a candidate for a route to accommodate an optical path is searched for, and best possible route with a minimum route selection index serving as an index for route search is selected. A use rate, serving as an index to indicate a usage condition of an optical frequency band in an optical fiber transmission line included in the route candidate, is collected. And, the above-described route selection index is determined based on the use rate.

Herein, the determining the route selection index can be configured to include selecting any one of a transmission characteristic index and a use rate index as the route selection index, based on a result obtained by comparing a value acquired by collecting the use rate with a predetermined reference value.

The above-mentioned each step may be performed by a computer. That is to say, it is possible to use a program and a computer-readable recording medium recording the program, and the program allows a computer to function as route selection means, use rate collecting means, and route selection index judgment means. The route selection means searches for a route candidate being a candidate for a route to accommodate an optical path, and selects best possible route with a minimum route selection index serving as an index for route search. The use rate collecting means collects a use rate serving as an index to indicate a usage condition of an optical frequency band in an optical fiber transmission line included in the route candidate. And the route selection index judgment means determines the route selection index based on the use rate.

As described above, according to the optical path controller 1000 and the method of controlling optical path of the present example embodiment, in the elastic optical network, it is possible to prevent a probability of opening an optical path from decreasing, with improving frequency utilization efficiency.

Second Example Embodiment

Figure 2:
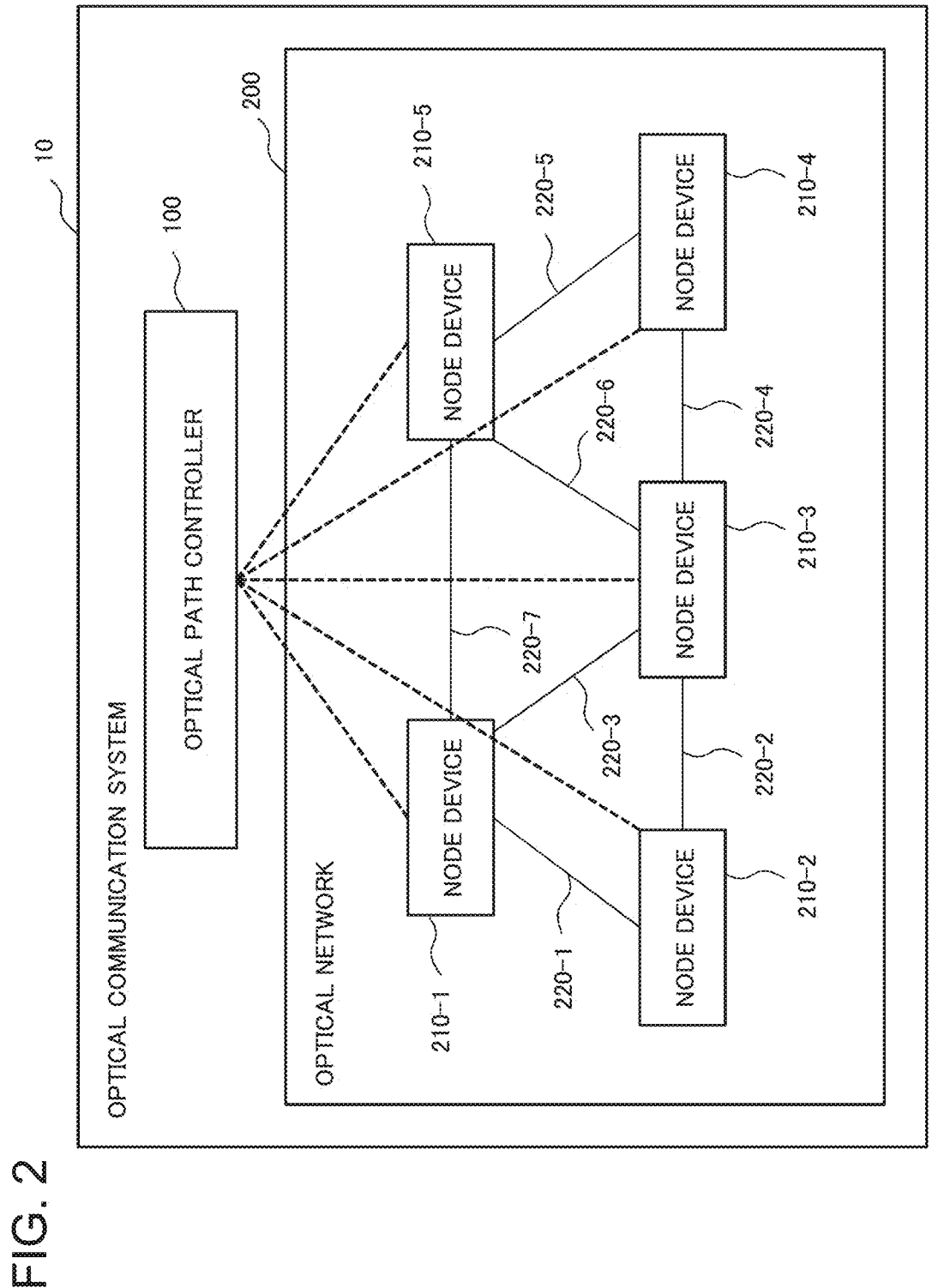
FIG. 2 is a block diagram illustrating a configuration of an optical communication system according to a second example embodiment of the present invention.

Next, a second example embodiment of the present invention will be described. FIG. 2 illustrates a configuration of an optical communication system 10 using an optical path controller according to the present example embodiment. The optical communication system 10 includes an optical path controller 100 and an optical network 200. FIG. 2 illustrates an example of the optical network 200 that is composed of five node devices 210-1 to 210-5 connected to each other through optical fiber transmission lines 220-1 to 220-7. In the following description, when the node devices 210-1 to 210-5 and the like are described without distinction, these node devices are simply described as the "node device 210" and the like, for example.

Figure 3:
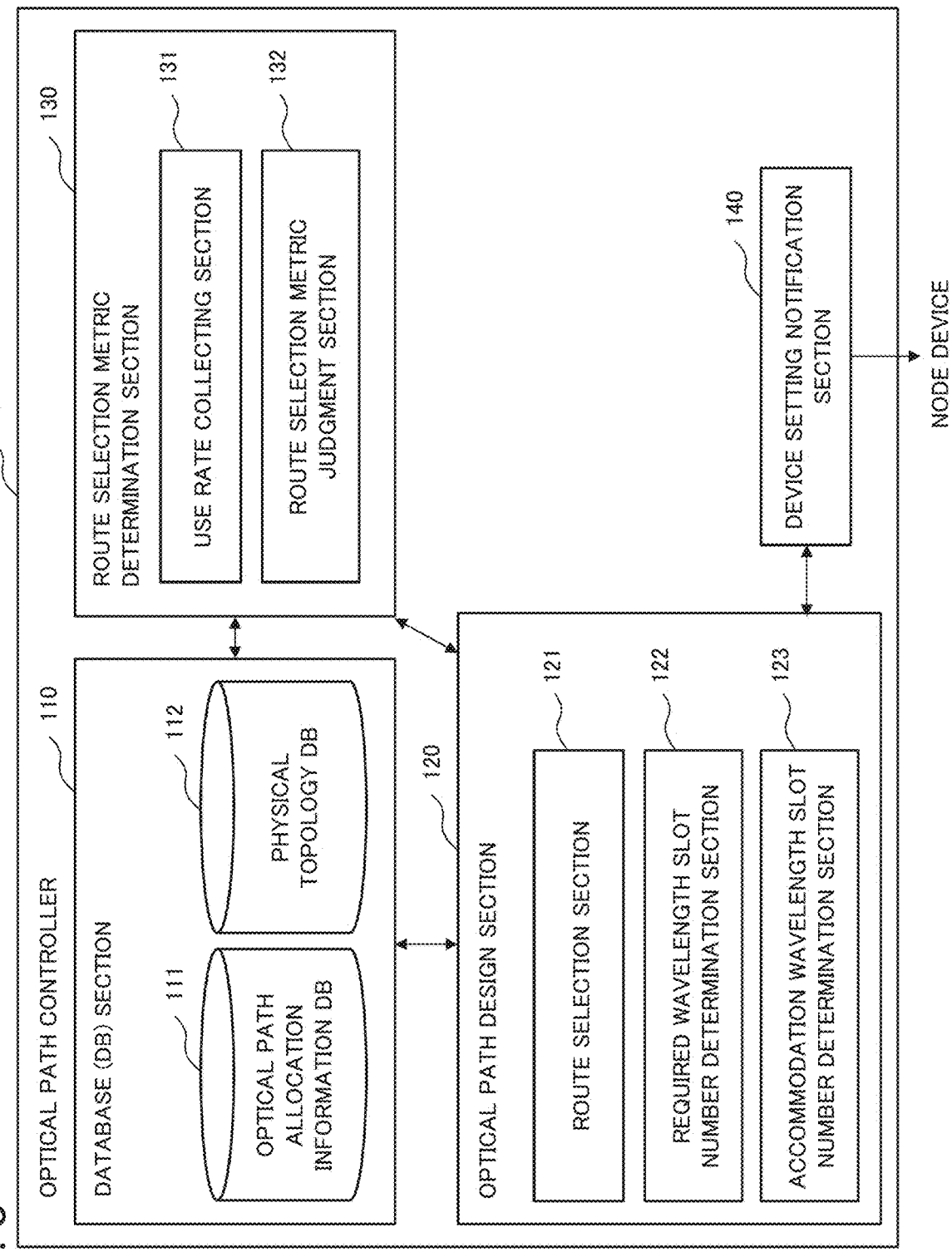
FIG. 3 is a block diagram illustrating a configuration of an optical path controller according to the second example embodiment of the present invention.

FIG. 3 illustrates a configuration of the optical path controller 100 according to the present example embodiment. The optical path controller 100 includes a database (DB) section 110, an optical path design section 120, a route selection metric determination section 130, and a device setting notification section 140.

The data base section 110 includes an optical path allocation information DB 111 and a physical topology DB 112. The optical path allocation information DB 111 stores physical route information on an optical path to be accommodated in the optical network 200, and a wavelength slot number. The physical topology DB 112 stores a relation of connections among the plurality of node devices 210, and a value of route selection metric of the optical fiber transmission line connecting optical nodes. The value of the route selection metric stored in the physical topology DB 112 is a value indicating a distance where "shortest route" is used as the route selection metric, for example, any one of a distance of the optical fiber transmission line, a signal-to-noise (S/N) ratio, and a delay amount.

The optical path design section 120 includes a route selection section 121, a required wavelength slot number determination section 122, and an accommodation wavelength slot number determination section 123.

The route selection section 121 selects, with reference to the physical topology DB 112, a route with minimum value of the route selection metric as a route connecting a start point node and a terminal point node of demand traffic. Adopting a route length as the route selection metric, the shortest route with the minimum route length can be selected. Alternatively, a minimum hop route, a minimum receiving optical signal-to-noise ratio (OSNR) degradation route, or a minimum delay route may be selected.

The required wavelength slot number determination section 122 determines a required wavelength slot number depending on the transmission characteristics of the route selected by the route selection section 121. The accommodation wavelength slot number determination section 123 determines an accommodation wavelength slot number to specify an unused wavelength slot corresponding to the required wavelength slot number. The accommodation wavelength slot number determination section 123 can determine the accommodation wavelength slot number corresponding to the unused wavelength slots by using a first-fit allocation method, a most-used allocation method, or a least-used allocation method, for example.

The route selection metric determination section 130 includes a use rate collecting section 131 and a route selection metric judgment section 132. The use rate collecting section 131 collects a use rate serving as an index to indicate a usage condition of an optical frequency band in an optical fiber transmission line, with respect to the shortest route selected by the route selection section 121. The route selection metric judgment section 132 determines the route selection metric used by the route selection section 121, based on a value obtained by collecting the use rate (collecting value).

The above-mentioned use rate is an index representing a usage condition as a ratio to a predetermined criterion, and is calculated with respect to each optical fiber transmission line 220. It is possible to use, as the use rate, a ratio of any one of a fragmented slot number in the optical fiber transmission line, an occupied wavelength slot number, and an occupied wavelength slot number of a high-priority optical path, to a total wavelength slot number in the optical fiber transmission line, for example. Alternatively, it is also possible to use, as the use rate, a ratio of any one of a fragmented slot area number in the optical fiber transmission line, an occupied wavelength slot area number, an allocated optical path number, and an allocated high-priority optical path number, to a total wavelength slot area number in the optical fiber transmission line. Here, "the area number" means the number of blocks each of which includes continuous wavelength slots.

In addition, it is possible to use, as the use rate, a ratio of the number of demand traffic accommodated in each optical fiber transmission line to a total number of demand traffic to be accommodated, in all the optical fiber transmission lines constituting the optical network 200. Alternatively, it is also possible to use, as the use rate, a ratio of a demand traffic capacity accommodated in the optical fiber transmission line to a total capacity of demand traffic.

It is possible to use, as the collecting value of the use rate, an average value, a maximum value, a minimum value, a standard deviation, or a variance value of the use rates in the optical fiber transmission lines targeted at collecting.

The optical path design section 120 stores, in the data base section 110, the route of the optical path to accommodate demand traffic, the wavelength slot number, and the accommodation wavelength slot number, and gives notice to the node device 210 through the device setting notification section 140. In FIG. 3, the one-way arrowed line toward the node device 210 indicates a direction of data flow most clearly, and does not intend to exclude bi-directionality. Much the same is true on the other drawings.

Figure 4:
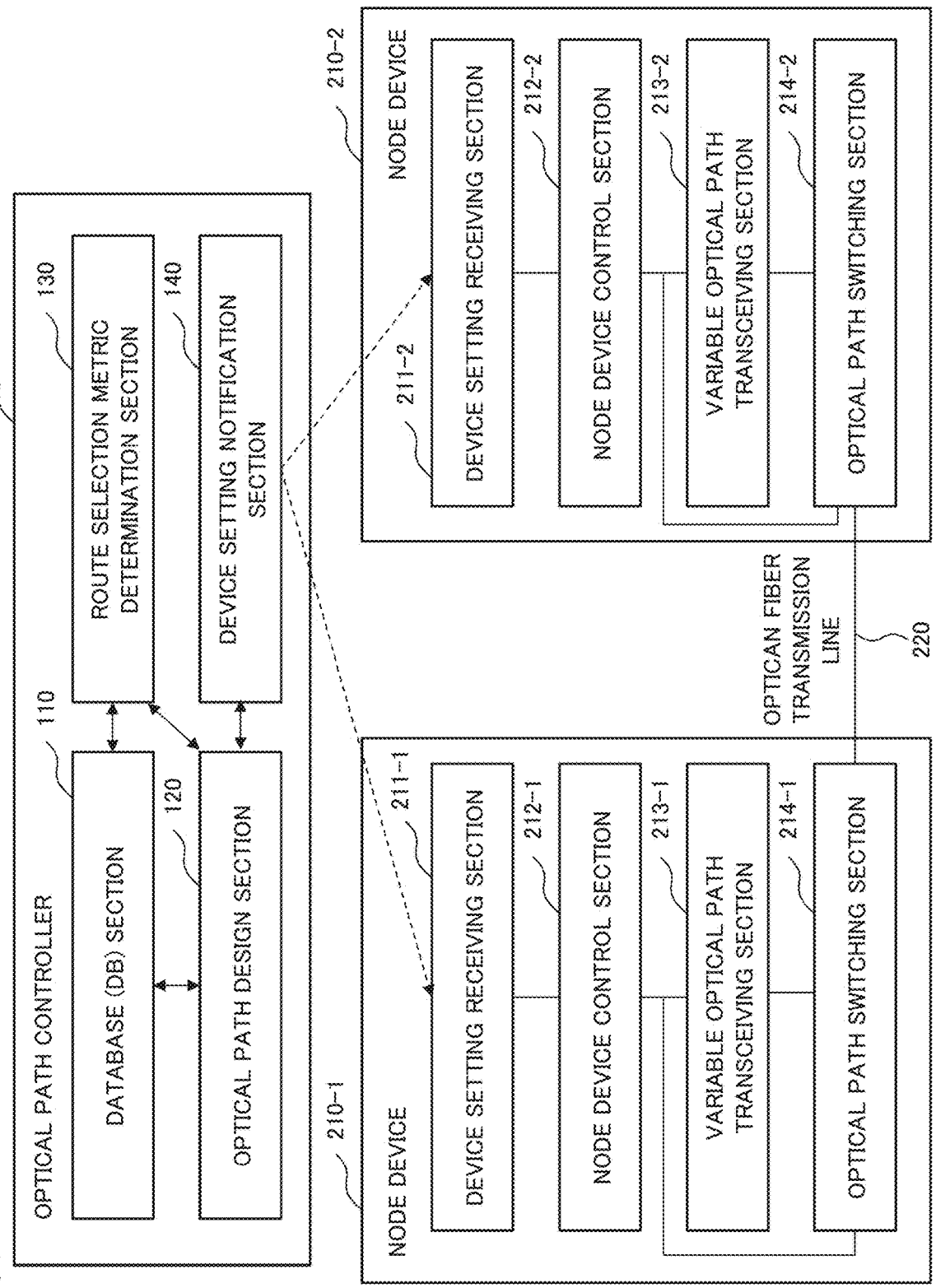
FIG. 4 is a block diagram illustrating a connection relationship between the optical path controller and node devices, and a configuration of the node device, according to the second example embodiment of the present invention.

FIG. 4 illustrates a connection relationship between the optical path controller 100 according to the present example embodiment and the node devices 210-1 and 210-2, and a configuration of the node devices 210-1 and 210-2.

The node device 210 includes a device setting receiving section 211, a node device control section 212, a variable optical path transceiving section 213, and an optical path switching section 214.

The device setting receiving section 211 receives optical path information concerning the route of the optical path, the wavelength slot number, and the accommodation wavelength slot number, which are described above, from the device setting notification section 140 included in the optical path controller 100. The node device control section 212 controls the variable optical path transceiving section 213 and the optical path switching section 214 based on the optical path information. The variable optical path transceiving section 213 sends signal light modulated based on a client signal constituting the demand traffic to the optical fiber transmission line 220 through the optical path switching section 214. The optical path switching section 214 switches the optical fiber transmission line 220 to be connected, based on the route of the optical path contained in the optical path information. The optical path to accommodate the demand traffic is established by the above-mentioned functions of the node device 210.

Next, the operation of the optical path controller 100 and the method of controlling optical path according to the present example embodiment will be described. FIG. 5 illustrates a flowchart to explain the operation of the optical path controller 100 and the method of controlling optical path according to the present example embodiment.

The optical path controller 100, first, reads one piece of demand traffic (Step S10), and determines a route selection metric (route selection index) that is an index used for searching for a route of the optical path to accommodate the demand traffic (Step S20).

In the step for determining the route selection metric (Step S20), first, the route selection section 121 searches the shortest route connecting the start point node and the terminal point node of the demand traffic (Step S201). Subsequently, the use rate collecting section 131 collects the use rates of the optical fiber transmission lines 220 included in the shortest route (Step S202).

Next, the route selection metric judgment section 132 compares the collecting value of the use rate with a reference value (Step S203). Here, the reference value can be set by a network operator, for example.

If the collecting value of the use rate is less than the reference value (Step S203/YES), the route selection metric judgment section 132 selects, as the route selection metric, "a transmission characteristic index" that is an index representing the transmission characteristics of the optical fiber transmission line (Step S204). In this case, the route selection section 121 can adopt a route length as the transmission characteristic index, and select the shortest route with the minimum route length. Instead of the route length, a hop count, a received optical signal-to-noise ratio, or a delay amount may be adopted, and instead of the shortest route, a minimum hop route, a minimum received optical signal-to-noise ratio degradation route, or a minimum delay route may be selected, respectively.

If the collecting value of the use rate is equal to or larger than the reference value (Step S203/NO), the route selection metric judgment section 132 selects, as the route selection metric, "a use rate index" that is an index based on the use rate (Step S205). It is possible to use, as the use rate index, any one of fragmented slot number, fragmented slot area number, occupied wavelength slot number, allocated optical path number, occupied slot number of high-priority optical path, allocated high-priority optical path number, accommodation traffic capacity, and accommodation traffic request number, for example.

Following the step for determining the route selection metric (Step S20), the route selection section 121 searches for the best possible route connecting the start point node and the terminal point node of the demand traffic based on the route selection metric determined by the route selection metric determination section 130 (Step S30). In this case, the route selection section 121 searches for the best possible route with reference to the physical topology DB 112.

The required wavelength slot number determination section 122 determines the required wavelength slot number to be required to open an optical path in the best possible route (Step S40). The accommodation wavelength slot number determination section 123 searches for an unused wavelength slot to accommodate an optical path with the required wavelength slot number with regard to the optical fiber transmission line 220 on the best possible route, and determines the accommodation wavelength slot number to specify the unused wavelength slot (Step S50).

If the allocation of the optical paths has been completed to all the demand traffic (Step S60/YES), the optical path design section 120 notifies each node device 210 of resource allocation information through the device setting notification section 140 (Step S70). The resource allocation information contains the route of the optical path, the required wavelength slot number, the accommodation wavelength slot number, and the like. The above-described steps have completed the operation to open the optical path.

If the allocation of the optical path has not been completed to all the demand traffic (Step S60/NO), subsequent one piece of the demand traffic is read (Step S10), and the above-mentioned steps are repeated.

Figure 6A:
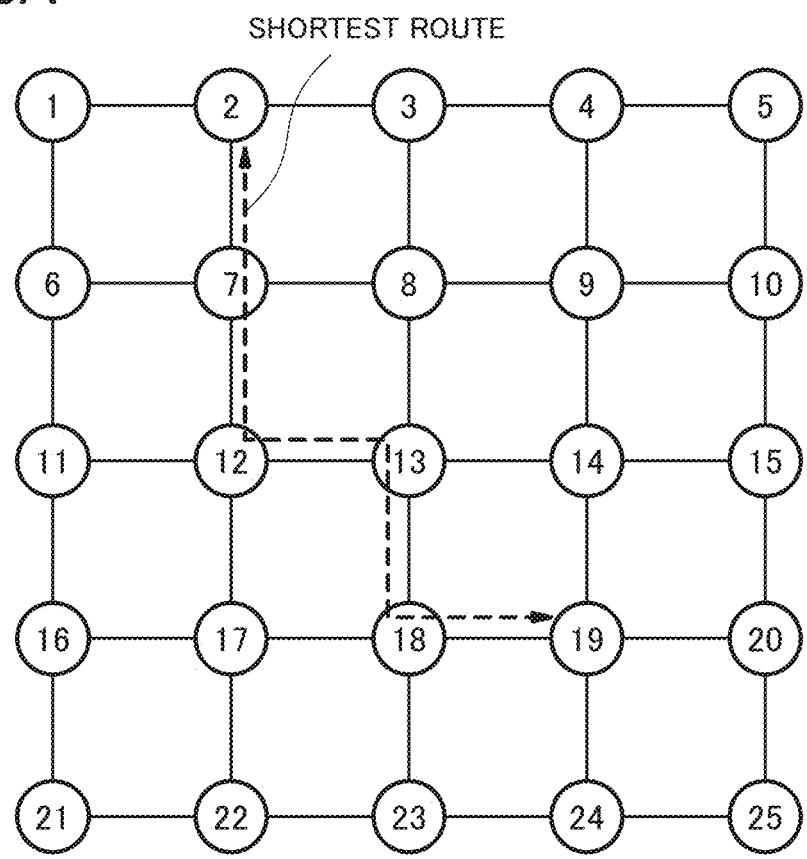
FIG. 6A is a diagram schematically illustrating a configuration of a mesh optical network to explain the operation of the optical path controller and the method of controlling optical path according to the second example embodiment of the present invention.
Figure 6B:
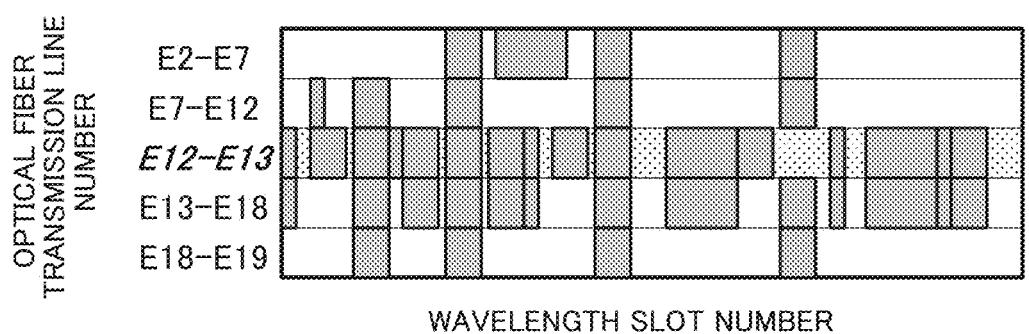
FIG. 6B is a diagram schematically illustrating usage conditions of an optical frequency band in each optical fiber transmission line to explain the operation of the optical path controller and the method of controlling optical path according to the second example embodiment of the present invention.

With reference to FIG. 6A and FIG. 6B, the operation of the optical path controller 100 and the method of controlling optical path according to the present example embodiment will be described more specifically. It will be described as an example to open an optical path to accommodate demand traffic between two node devices E2 and E19 in the mesh optical network illustrated in FIG. 6A. It is assumed that the reference value for the use rate is determined by a network operator, and that the reference value is set at 60% in this case.

As a result of searching for the shortest route by the route selection section 121, the shortest route is a route through the respective node devices of E2-E7, E7-E12, E12-E13, E13-E18, and E18-E19. The use rate is defined as a ratio of a fragmented slot number to an unused wavelength slot area number, and the route selection metric is determined comparing a maximum value of the use rate (maximum use rate) and the reference value.

FIG. 6B schematically illustrates usage conditions of the optical frequency bands in each optical fiber transmission line. As a result of collection performed by the use rate collecting section 131, the maximum use rate is equal to 70% in the optical fiber transmission line E12-E13 included in the above-mentioned shortest route. Because the maximum use rate exceeds the above-mentioned reference value (60%), the route selection metric judgment section 132 determines to adopt "the use rate index" as the route selection metric. Accordingly, the route with the minimum use rate is selected as a route of the optical path.

Figure 7:
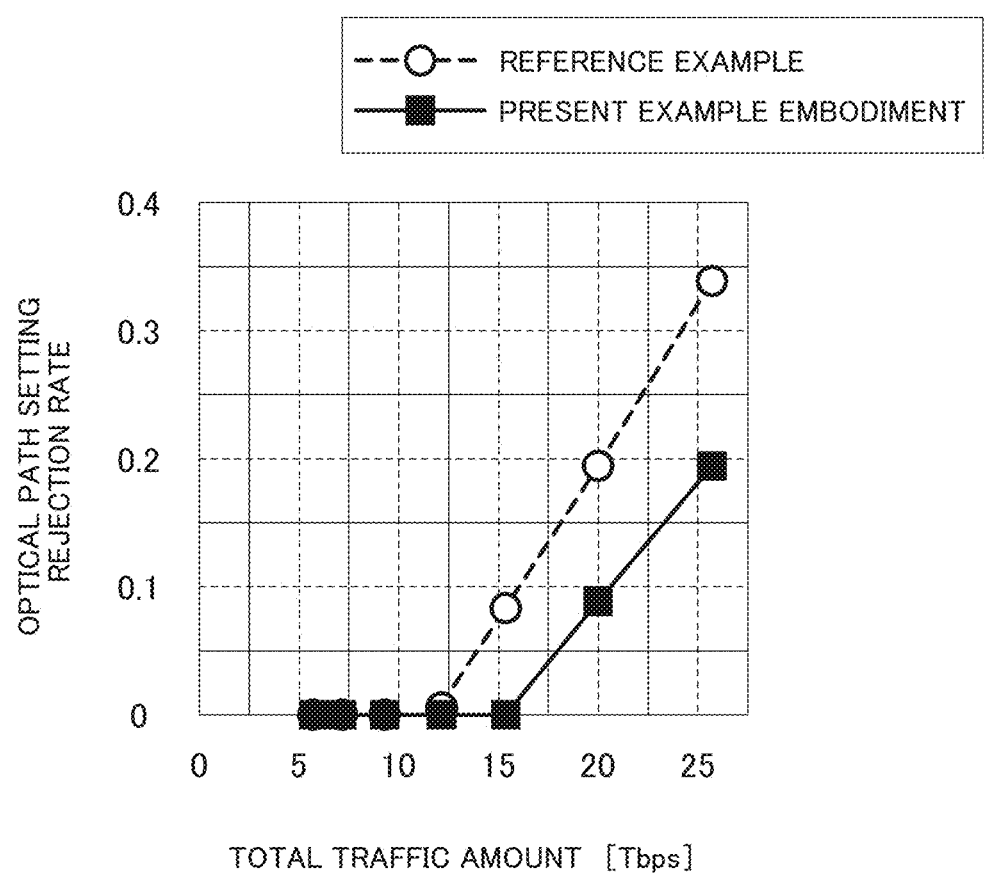
FIG. 7 is a graph illustrating results of an optical path setting rejection rate calculated by a computer simulation with use of the optical path controller and the method of controlling optical path according to the second example embodiment of the present invention.

FIG. 7 illustrates computer simulation results of optical path setting rejection rates in the elastic optical network, using the optical path controller 100 and the method of controlling optical path according to the present example embodiment. The optical path setting rejection rate means a value obtained by dividing the number of optical paths failing in allocation by the number of optical paths required to be opened. Consequently, the value of the optical path setting rejection rate becomes zero if the allocation is successfully achieved to all optical paths required to be opened. FIG. 7 illustrates reference examples obtained by setting optical paths in the shortest route always using "the transmission characteristic index" as the route selection metric.

As illustrated in FIG. 7, it can be seen that the optical path setting rejection rate increases with an increase in the total traffic amount. As can be seen in FIG. 7, the increase in the optical path setting rejection rate can be suppressed according to the optical path controller 100 and the method of controlling optical path of the present example embodiment. This makes it possible to increase the probability of opening an optical path.

As described above, according to the optical path controller 100 and the method of controlling optical path of the present example embodiment, in the elastic optical network, it is possible to prevent a probability of opening an optical path from decreasing, with improving frequency utilization efficiency.

In general, the use rate with respect to each optical fiber transmission line varies widely. For example, according to one example obtained by a computer simulation, the average use rate of the optical fiber transmission line in the entire optical network is equal to 37%, whereas the maximum value of the use rate with respect to each optical fiber transmission line sometimes reaches 80%. That is to say, if a route to allocate an optical path is selected based on the use rate for the entire optical network, the probability of opening an optical path is not necessarily improved because optical fiber transmission lines to allocate corresponding optical paths differ with respect to each demand traffic.

In contrast, the optical path controller 100 and the method of controlling optical path according to the present example embodiment are configured to limit the object of collecting the use rate to the optical fiber transmission line in the shortest route that can be selected as the optical path route to accommodate the demand traffic. This makes it possible to select an optimum route selection metric depending on the demand traffic, which also enables the success probability in allocating optical paths to increase.

Third Example Embodiment

Figure 8:
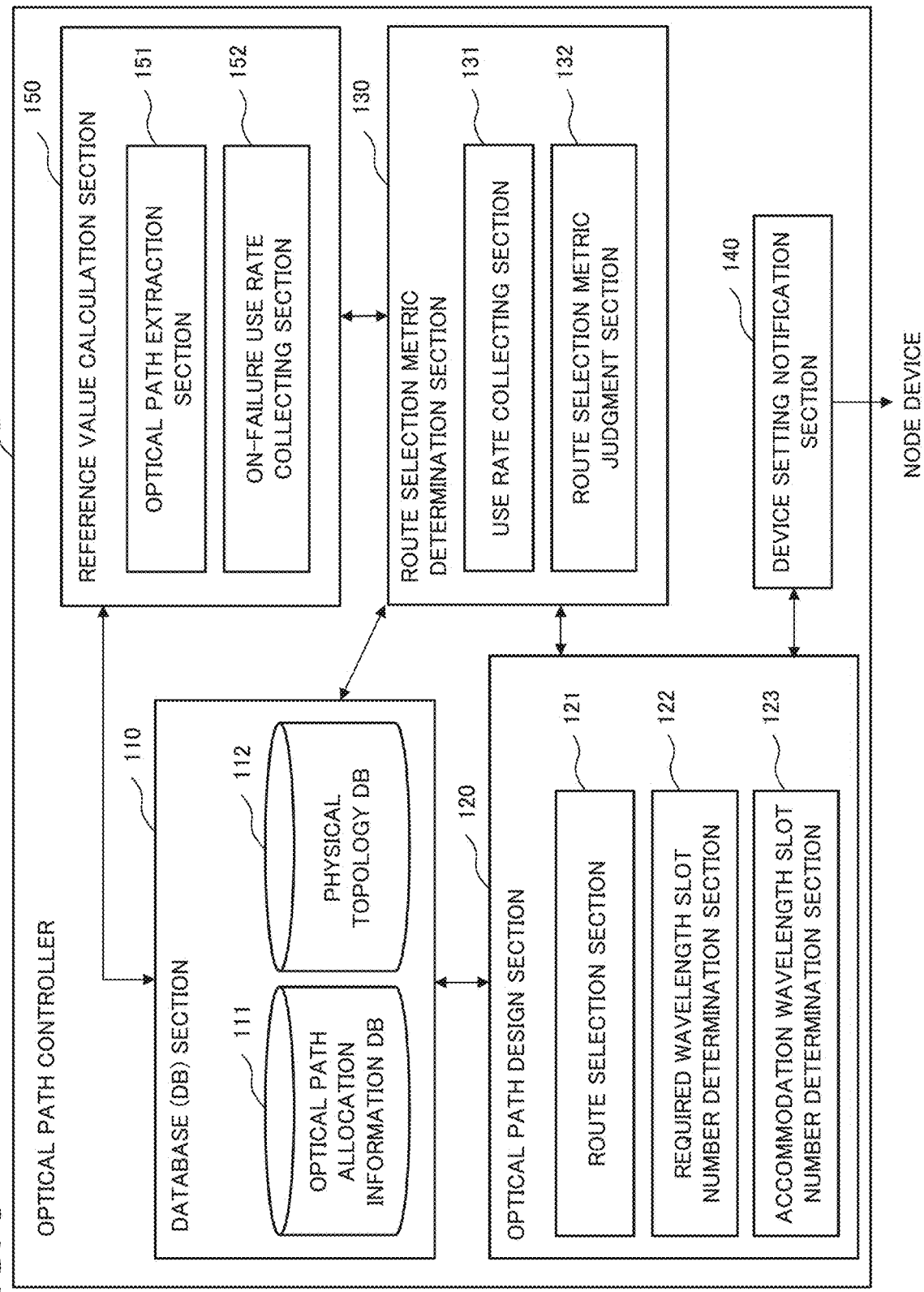
FIG. 8 is a block diagram illustrating a configuration of an optical path controller according to a third example embodiment of the present invention.

Next, a third example embodiment of the present invention will be described. FIG. 8 illustrates a configuration of an optical path controller 100-1 according to the present example embodiment. The optical path controller 100-1 includes the database (DB) section 110, the optical path design section 120, the route selection metric determination section 130, and the device setting notification section 140. The above configurations are similar to those of the optical path controller 100 according to the second example embodiment; consequently, those detailed descriptions are not repeated.

The optical path controller 100-1 according to the present example embodiment further includes a reference value calculation section 150. The reference value calculation section 150 includes an optical path extraction section 151 and an on-failure use rate collecting section 152.

The optical path extraction section 151 extracts an optical path that the optical path design section 120 has failed to accommodate in a wavelength slot. Specifically, the optical path extraction section 151 extracts an optical path for which an optical frequency band fails to be reserved in an optical fiber transmission line included in the best possible route selected by the optical path design section 120.

The on-failure use rate collecting section 152 collects the use rates of the optical fiber transmission lines 220 included in the route selected for the optical path failed to be accommodated that the optical path extraction section 151 has extracted. A kind of the use rate used here can be the same as that used by the route selection metric determination section 130.

The route selection metric judgment section 132 included in the route selection metric determination section 130 uses, as the reference value, the use rate collected by the on-failure use rate collecting section 152. Specifically, it is possible to use, as the reference value, any one of an average value, a maximum value, a minimum value, a standard deviation, and a variance value of the use rates, for example.

Figure 9:
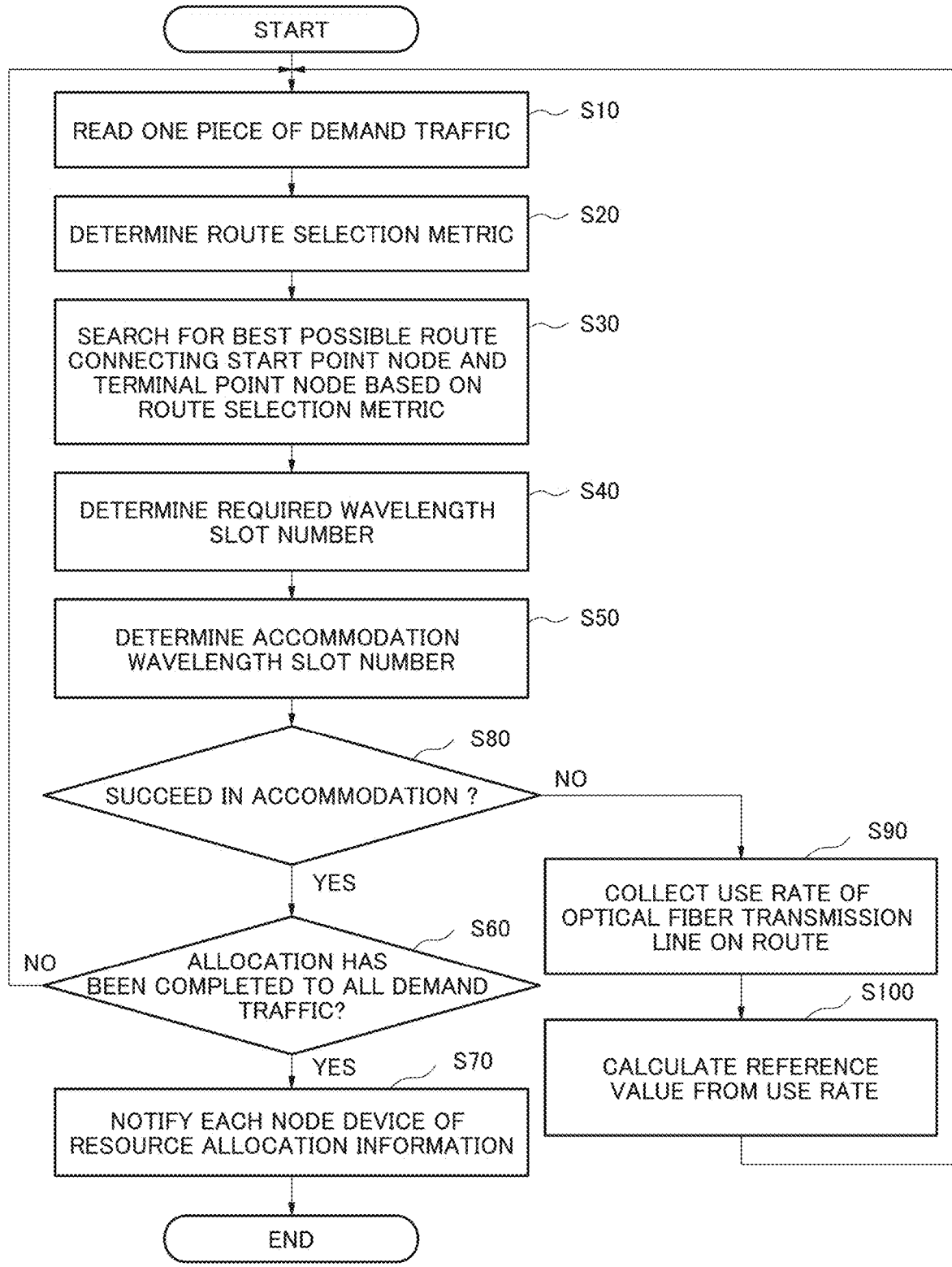
FIG. 9 is a flowchart to explain an operation of the optical path controller and a method of controlling optical path according to the third example embodiment of the present invention.

Next, the operation of the optical path controller 100-1 and the method of controlling optical path according to the present example embodiment will be described. FIG. 9 illustrates a flowchart to explain the operation of the optical path controller 100-1 and the method of controlling optical path according to the present example embodiment.

The optical path controller 100-1, first, reads one piece of demand traffic (Step S10), and the route selection metric determination section 120 determines the route selection metric (Step S20). The route selection section 121 searches for the best possible route connecting the start point node and the terminal point node of the demand traffic based on the determined route selection metric with reference to the physical topology DB 112 (Step S30).

The required wavelength slot number determination section 122 determines a required wavelength slot number to be required to open an optical path in the best possible route (Step S40). The accommodation wavelength slot number determination section 123 searches for an unused wavelength slot to accommodate an optical path with the required wavelength slot number with regard to the optical fiber transmission line 220 on the best possible route, and determines the accommodation wavelength slot number to specify the unused wavelength slot (Step S50).

Next, it is determined whether the accommodation, of the optical path in the wavelength slot specified by the accommodation wavelength slot number determined here, has succeeded or not (Step S80). Specifically, it is determined whether to have succeeded or not in reserving the optical frequency band to be required to accommodate the optical path in the optical fiber transmission line included in the best possible route.

If the accommodation of the optical path in the wavelength slot has succeeded (Step S80/YES), it is determined whether or not to have completed allocating the optical paths to all the demand traffic (Step S60).

If the allocation of the optical paths has been completed to all the demand traffic (Step S60/YES), the optical path design section 120 notifies each node device 210 of resource allocation information through the device setting notification section 140 (Step S70). The resource allocation information contains the route of the optical path, the required wavelength slot number, the accommodation wavelength slot number, and the like. The above-described steps have completed the operation to open the optical path.

In contrast, if the accommodation of the optical path to the wavelength slot with the determined accommodation wavelength slot number has failed (Step S80/NO), the on-failure use rate collecting section 152 collects the use rate of the optical fiber transmission line 220 included in the route for the optical path having failed in the accommodation (Step S90). Then a reference value is calculated from the use rate of each optical fiber transmission line (Step S100). The reference value newly calculated here can be applied to a subsequently received traffic demand. The optical path may be set by searching for the best possible route again from the step for determining the route selection metric (Step S20) using the reference value newly calculated here.

Figures 10A, 10B:
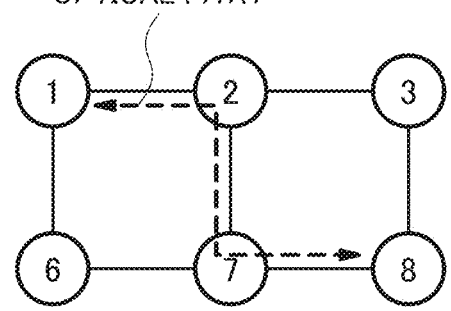
FIG. 10A is a diagram illustrating an example of an optical path having failed in accommodation, to explain the operation of the optical path controller and the method of controlling optical path according to the third example embodiment of the present invention.
FIG. 10B is a diagram illustrating examples of reference value calculated by the optical path controller and the method of controlling optical path according to the third example embodiment of the present invention.

FIG. 10A illustrates an example of an optical path having failed in accommodation. FIG. 10B illustrates an example of calculating a reference value in this case. As illustrated in FIG. 10B, the use rate is calculated with respect to each optical fiber transmission line in the route for the optical path having failed in accommodation. Then a maximum value of the use rates calculated here is obtained, and the maximum value (78%) is set as a new reference value.

As described above, the optical path setting rejection rate can be minimized by using the use rate for the route of the optical path having failed in accommodation (on-failure use rate) as the reference value. In other words, the on-failure use rate is a threshold value at which to fail in allocating an optical path to the shortest route, reflecting the physical topology of the network or traffic demand conditions. Accordingly, the on-failure use rate is an optimum reference value for the purpose of achieving a balance between the improvement in frequency utilization efficiency and the increase in a probability of opening an optical path. The allocation of optical paths using the above-described threshold value makes it possible to minimize the optical path setting rejection rate, that is, maximize an optical path allocation number. Consequently, it is possible to increase the probability of opening an optical path.

As described above, according to the optical path controller 100-1 and the control method of the present example embodiment, in the elastic optical network, it is possible to prevent a probability of opening an optical path from decreasing, with improving frequency utilization efficiency.

The optical path controller 100-1 and the method of controlling optical path according to the present example embodiment are configured to limit the object of collecting the use rate to the optical fiber transmission line in the shortest route that can be selected as the optical path route to accommodate the demand traffic. This makes it possible to select an optimum route selection metric depending on the demand traffic, which also enables the success probability in allocating optical paths to increase.

Fourth Example Embodiment

Figure 11:
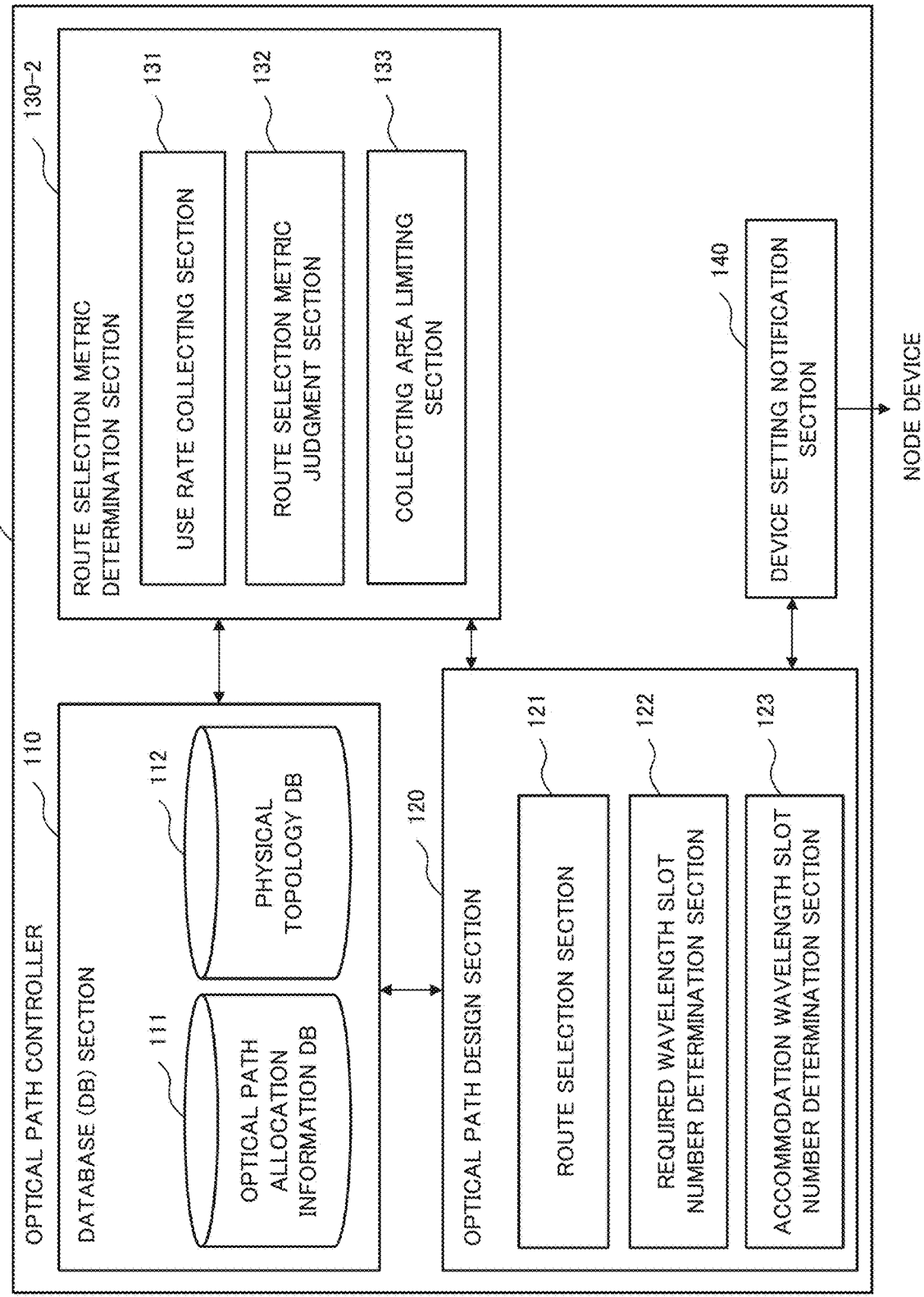
FIG. 11 is a block diagram illustrating a configuration of an optical path controller according to a fourth example embodiment of the present invention.

Next, a fourth example embodiment of the present invention will be described. FIG. 11 illustrates a configuration of an optical path controller 100-2 according to the present example embodiment. The optical path controller 100-2 includes the database (DB) section 110, the optical path design section 120, a route selection metric determination section 130-2, and the device setting notification section 140. Here, the route selection metric determination section 130-2 includes a collecting area limiting section (collecting area limiting means) 133 in addition to the use rate collecting section 131 and the route selection metric judgment section 132. The configurations other than the route selection metric determination section 130-2 are similar to those of the optical path controller 100 according to the second example embodiment; consequently, those descriptions are not repeated.

The collecting area limiting section 133 limits optical fiber transmission lines that can be selected as an optical path route. Specifically, the collecting area limiting section 133 selects a limited route candidate, limiting the scope of route candidates each of which is a candidate for a route to accommodate an optical path. And the collecting area limiting section 133 limits an optical fiber transmission line to be targeted for which the use rate collecting section (use rate collecting means) 131 collects the use rate, to the scope included in the limited route candidates. In this case, the route selection section (route selection means) 121 selects the best possible route with the route selection metric (route selection index) being at a minimum from among the limited route candidates. The use rate collecting section (use rate collecting means) 131 collects the use rate of the optical fiber transmission line included in the limited route candidate.

Specifically, the collecting area limiting section 133 can be configured to limit it to the optical fiber transmission line 220 included in a route to be selected as k-th shortest route, for example. Here, k is an integer more than one, and the k-th shortest route means the first k-th short routes. The value of k can be determined by an optical network operator, for example. The collecting area limiting section 133 may be configured to limit an optical fiber transmission line to be selected as the optical path route, to the optical fiber transmission line 220 included in any one of a k-th minimum hop route, a k-th received optical signal-to-noise ratio (OSNR) degradation route, and a k-th minimum delay route. That is to say, the collecting area limiting section 133 can be configured to select a plurality of route candidates including a route candidate with the best possible transmission characteristics (best possible route candidate) as the above-described limited route candidate.

The use rate collecting section 131 collects the use rate in the optical fiber transmission line limited by the collecting area limiting section 133. The route selection metric judgment section 132 determines a route selection metric based on a collecting value of the use rates collected by the use rate collecting section 131.

Figure 12:
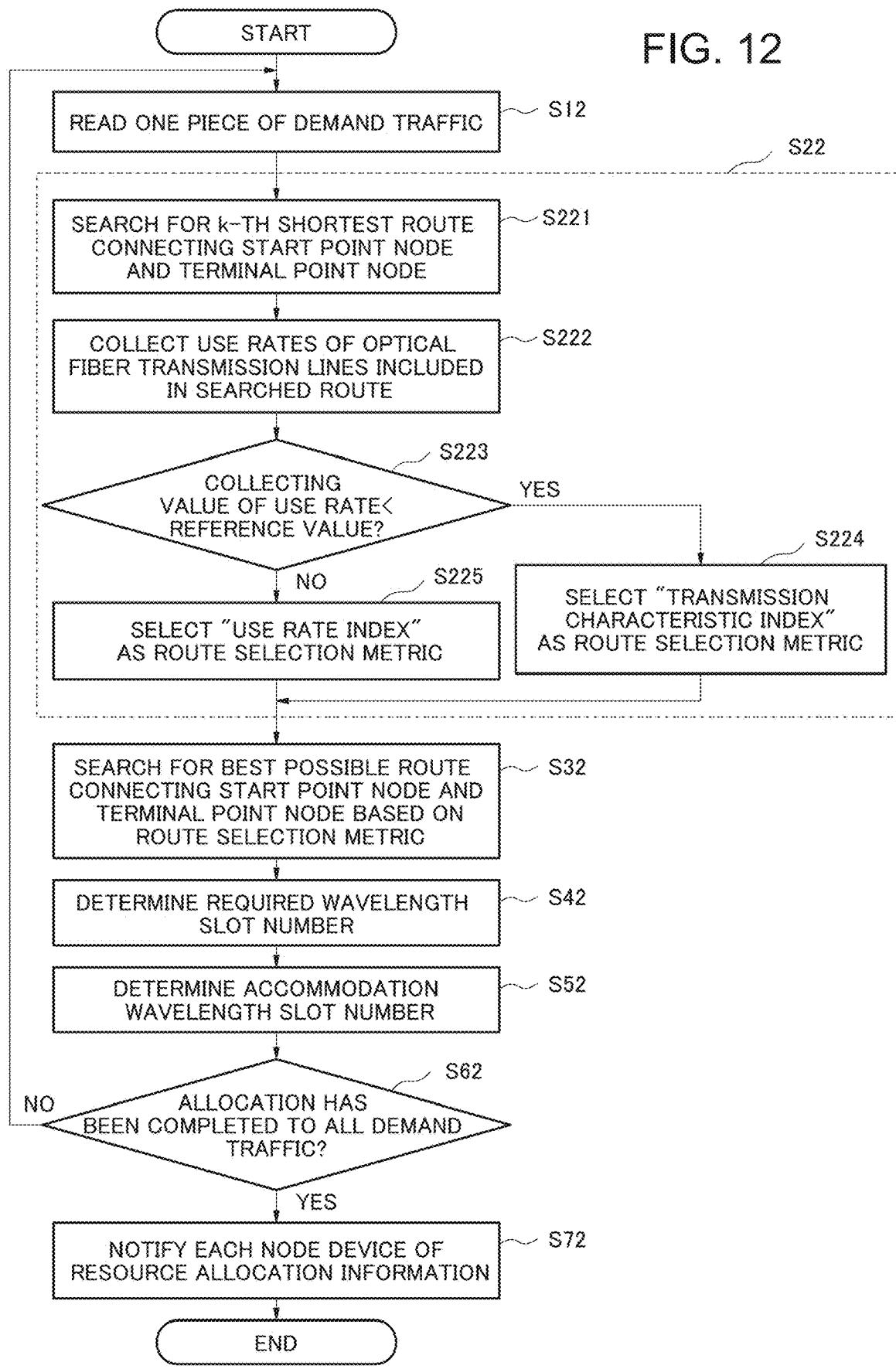
FIG. 12 is a flowchart to explain an operation of the optical path controller and a method of controlling optical path according to the fourth example embodiment of the present invention.

Next, the operation of the optical path controller 100-2 and the method of controlling optical path according to the present example embodiment will be described. FIG. 12 illustrates a flowchart to explain the operation of the optical path controller 100-2 and the method of controlling optical path according to the present example embodiment.

The optical path controller 100-2, first, reads one piece of demand traffic (Step S12), and determines a route selection metric (route selection index) that is an index used for searching for a route of the optical path to accommodate the demand traffic (Step S22).

In the step for determining the route selection metric (Step S22), first, the route selection section 121 searches for the k-th shortest route connecting the start point node and the terminal point node of the demand traffic (Step S221). The collecting area limiting section 133 limits a collecting area to the k-th shortest route resulting from the search. The use rate collecting section 131 collects the use rates of the optical fiber transmission lines 220 included in the searched route limited here (Step S222).

Next, the route selection metric judgment section 132 compares the collecting value of the use rate with a reference value (Step S223). It is possible to use, as the collecting value of the use rate, an average value, a maximum value, a minimum value, a standard deviation, or a variance value of the use rates in the optical fiber transmission lines targeted at collecting. The reference value can be set by a network operator, for example.

If the collecting value of the use rate is less than the reference value (Step S223/YES), the route selection metric judgment section 132 selects, as the route selection metric, "a transmission characteristic index" that is an index representing the transmission characteristics of the optical fiber transmission line (Step S224). In this case, the route selection section 121 can adopt a route length as the transmission characteristic index, and select the shortest route with the minimum route length. Instead of the route length, a hop count, a received optical signal-to-noise ratio, or a delay amount may be adopted, and instead of the shortest route, a minimum hop route, a minimum received optical signal-to-noise ratio degradation route, or a minimum delay route may be selected, respectively.

If the collecting value of the use rate is equal to or larger than the reference value (Step S223/NO), the route selection metric judgment section 132 selects, as the route selection metric, "a use rate index" that is an index based on the use rate (Step S225). It is possible to use, as the use rate index, any one of fragmented slot number, fragmented slot area number, occupied wavelength slot number, allocated optical path number, occupied slot number of high-priority optical path, allocated high-priority optical path number, accommodation traffic capacity, and accommodation traffic request number, for example.

Following the step for determining the route selection metric (Step S22), the route selection section 121 searches for the best possible route connecting the start point node and the terminal point node of the demand traffic based on the route selection metric determined by the route selection metric determination section 130-2 (Step S32). In this case, the route selection section 121 searches for the best possible route with reference to the physical topology DB 112.

The required wavelength slot number determination section 122 determines the required wavelength slot number to be required to open an optical path in the best possible route (Step S42). The accommodation wavelength slot number determination section 123 searches for an unused wavelength slot to accommodate an optical path with the required wavelength slot number with regard to the optical fiber transmission line 220 on the best possible route, and determines the accommodation wavelength slot number to specify the unused wavelength slot (Step S52).

If the allocation of the optical paths has been completed to all the demand traffic (Step S62/YES), the optical path design section 120 notifies each node device 210 of resource allocation information through the device setting notification section 140 (Step S72). The resource allocation information contains the route of the optical path, the required wavelength slot number, the accommodation wavelength slot number, and the like. The above-described steps have completed the operation to open the optical path.

If the allocation of the optical paths has not been completed to all the demand traffic (Step S62/NO), subsequent one piece of the demand traffic is read (Step S12), and the above-mentioned steps are repeated.

Figure 13A:
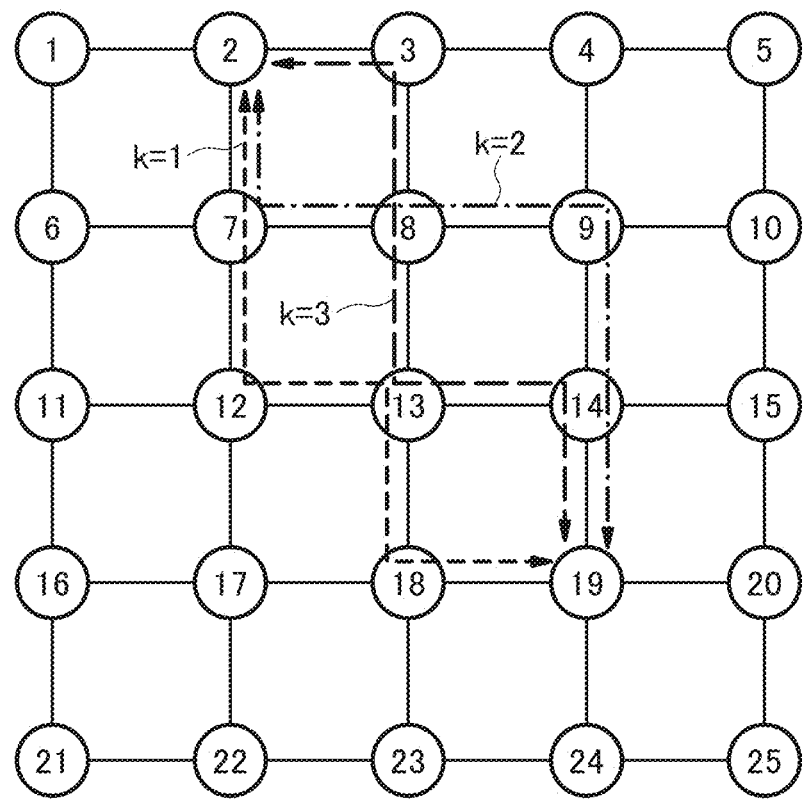
FIG. 13A is a diagram schematically illustrating a configuration of a mesh optical network to explain the operation of the optical path controller and the method of controlling optical path according to the fourth example embodiment of the present invention.

Next, with reference to FIG. 13A and FIG. 13B, the operation of the optical path controller 100-2 and the method of controlling optical path according to the present example embodiment will be described more specifically. It will be described as an example to open an optical path to accommodate demand traffic between two node devices E2 and E19 in the mesh optical network illustrated in FIG. 13A. It is assumed that the reference value for the use rate is determined by a network operator, and that the reference value is set at 70% in this case.

As a result of searching for the k-th shortest routes with k=3 by the route selection section 121, a first shortest route (k=1), a second shortest route (k=2), and a third shortest route (k=3) are selected respectively as follows (see FIG. 13A). Here, "En–Em" (n, m=1 to 25) represents optical fiber transmission line connecting a node device En and a node device Em. Each of the first shortest route (k=1), the second shortest route (k=2), and the third shortest route (k=3) passes through the same number of node devices, but the distances of their physical routes increase in length in this order.
The first shortest route: E2-E7, E7-E12, E12-E13, E13-E18, E18-E19
The second shortest route: E2-E7, E7-E8, E8-E9, E9-E14, E14-E19
The third shortest route: E2-E3, E3-E8, E8-E13, E13-E14, E14-E19

Figure 13B:
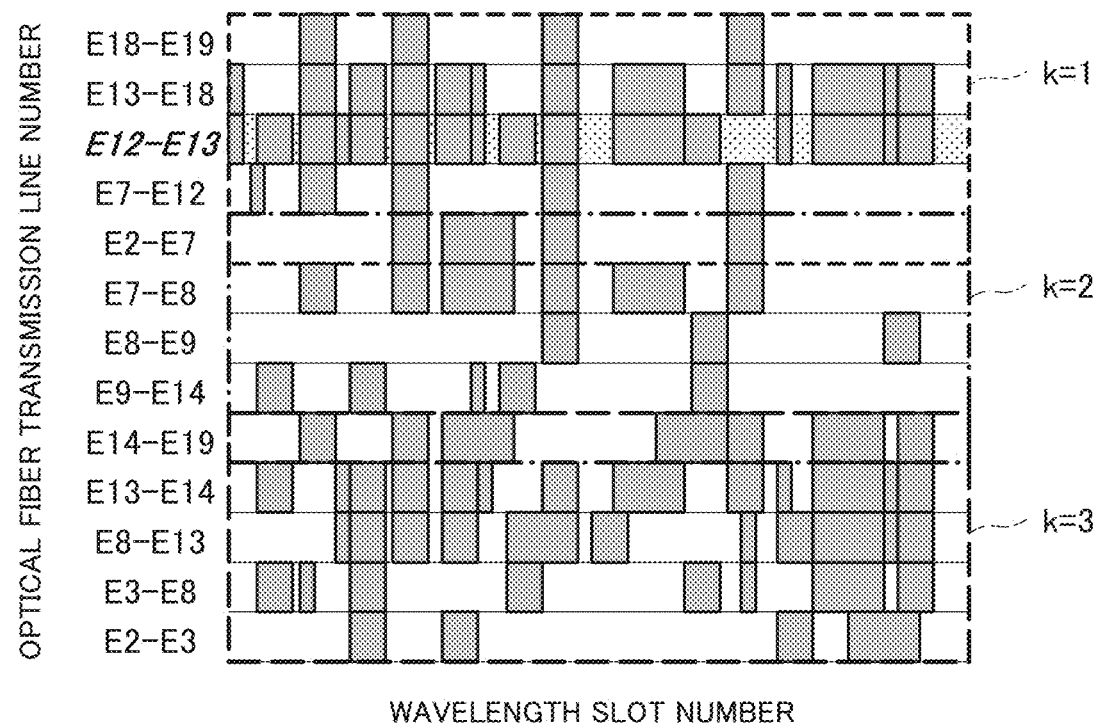
FIG. 13B is a diagram schematically illustrating usage conditions of an optical frequency band in each optical fiber transmission line to explain the operation of the optical path controller and the method of controlling optical path according to the fourth example embodiment of the present invention.

FIG. 13B schematically illustrates usage conditions of the optical frequency bands in each optical fiber transmission line described above.

The collecting area limiting section 133 limits the target for collecting the use rate to the optical fiber transmission lines 220 included in the above-described three routes. The use rate is defined as a ratio of allocated wavelength slot number to the total wavelength slot number, and the route selection metric is determined comparing the maximum use rate and the reference value.

As a result of collecting the use rates by the use rate collecting section 131, the maximum use rate is equal to 71% in the optical fiber transmission line E12-E13 among the optical fiber transmission lines included in the above-described three routes. Because the maximum use rate exceeds the above-mentioned reference value (70%), the route selection metric judgment section 132 determines to adopt "the use rate index" as the route selection metric. In this case, the second shortest route with the minimum use rate is selected as the best possible route.

The use rate for the optical path failing in allocation to the optical fiber transmission line 220 before receiving a traffic demand may be used as the above-mentioned reference value.

As described above, the optical path controller 100-2 and the method of controlling optical path according to the present example embodiment are configured to determine the route selection metric based on the use rate of the optical frequency band in the optical fiber transmission line. As a result, in the elastic optical network, it is possible to prevent a probability of opening an optical path from decreasing, with improving frequency utilization efficiency. They are also configured to limit the object of collecting the use rate to the optical fiber transmission line that can be selected as the optical path route to accommodate the demand traffic, for example, the optical fiber transmission line included in the k-th shortest routes. This makes it possible to select an optimum route selection metric depending on the demand traffic, which also enables the success probability in allocating optical paths to increase.

In addition, the optical path controller 100-2 and the method of controlling optical path according to the present example embodiment can be configured to select an optical path allocation route from among more than one searched route (k-th shortest routes), based on the determined route selection metric. This makes it possible to select a route with relatively favorable transmission characteristics even though "the use rate index" is selected as the route selection metric. As a result, it is possible to improve frequency utilization efficiency.

Fifth Example Embodiment

Figure 14:
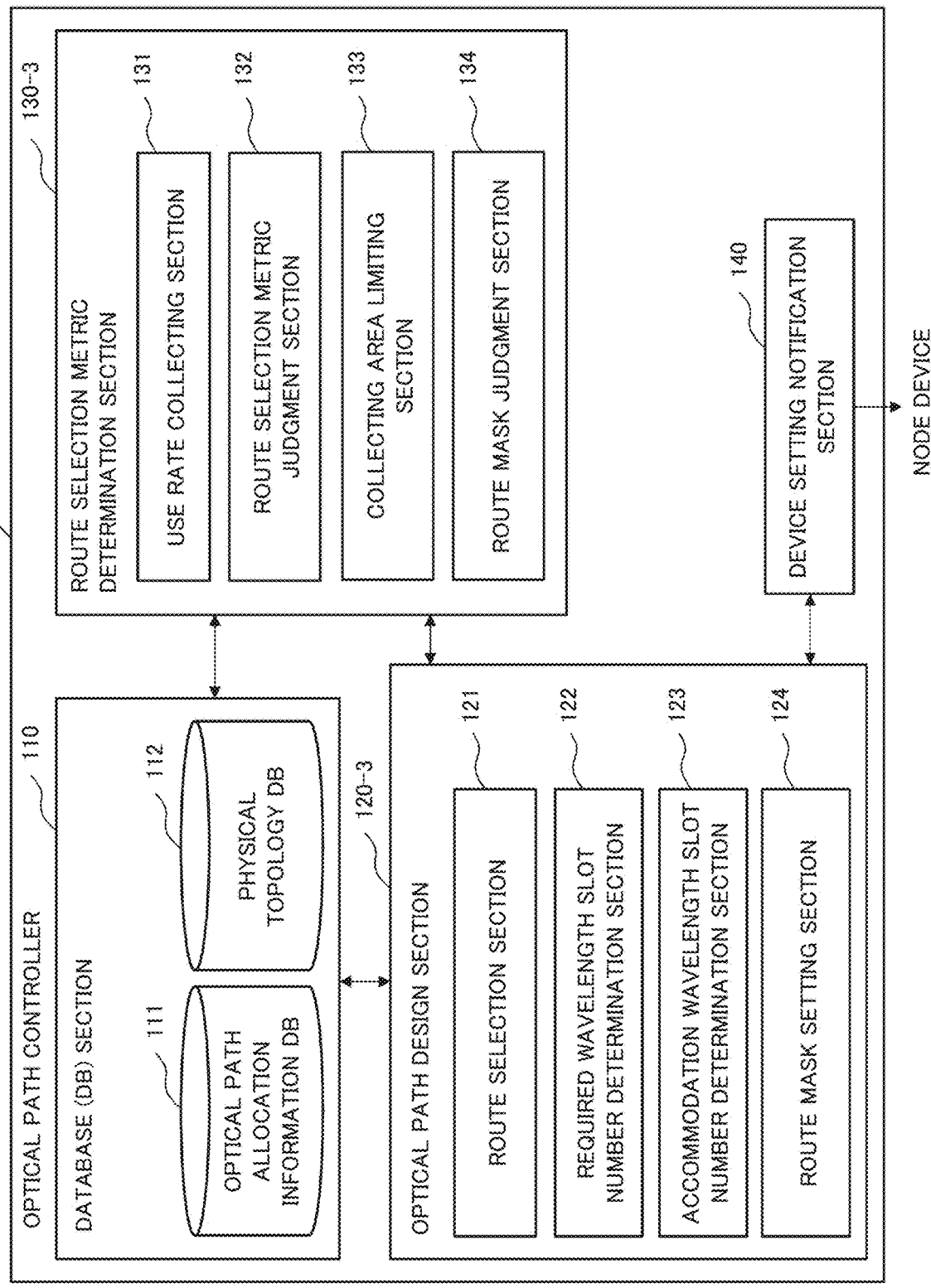
FIG. 14 is a block diagram illustrating a configuration of an optical path controller according to a fifth example embodiment of the present invention.

Next, a fifth example embodiment of the present invention will be described. FIG. 14 illustrates a configuration of an optical path controller 100-3 according to the present example embodiment. The optical path controller 100-3 according to the present example embodiment includes the data base section 110, an optical path design section 120-3, a route selection metric determination section 130-3, and the device setting notification section 140.

The optical path design section 120-3 includes a route mask setting section (route mask setting means) 124 in addition to the route selection section 121, the required wavelength slot number determination section 122, and the accommodation wavelength slot number determination section 123.

The route selection section 121 selects a route with minimum value of the route selection metric as a route connecting the start point node and the terminal point node of the demand traffic. In this case, the route mask setting section 124 sets a route mask to the optical fiber transmission line 220, which is excluded from a target to be selected by the route selection section 121. The route mask is set for all the optical fiber transmission lines 220 on the selected routes, which makes it possible to select a route independent of previously selected route, that is, a disjoint route. In this case, the route mask is set for a plurality of selected routes, which makes it possible to select a plurality of disjoint routs. In order to select such disjoint routes, the route mask setting section 124 can use Suurballe algorithm or Bhandari algorithm, for example.

The required wavelength slot number determination section 122 determines the required wavelength slot number with respect to each disjoint route depending on the transmission characteristics. The accommodation wavelength slot number determination section 123 determines the accommodation wavelength slot number to specify an unused wavelength slot corresponding to the required wavelength slot number.

The route selection metric determination section 130-3 includes a route mask judgment section (route mask judgment means) 134 in addition to the use rate collecting section 131, the route selection metric judgment section 132, and the collecting area limiting section 133.

The collecting area limiting section 133 limits the optical fiber transmission line that can be selected as the optical path route. In this case, the collecting area limiting section 133 can select a plurality of (disjoint) route candidates independent of each other (independent route candidates) as limited route candidate obtained by limiting the scope of the route candidate. Specifically, the collecting area limiting section 133 can be configured to limit it to the optical fiber transmission line 220 included in k disjoint routes, for example. Here, k is an integer more than one, and can be determined by an optical network operator. The collecting area limiting section 133 may limit the optical fiber transmission line to the optical fiber transmission line 220 included in the area surrounded by the k disjoint routes. Depending on the connection relationship of the node devices 210 constituting the optical network 200, the number of disjoint searched routes for the demand traffic can get less than k. In this case, a route with the most disjoint property can be selected.

The use rate collecting section 131 collects the use rate of the optical fiber transmission line in the area limited by the collecting area limiting section 133. The route selection metric judgment section 132 determines a route selection metric to be used by the route selection section 121, based on the collecting value of the use rates collected by the use rate collecting section 131. The route mask judgment section 134 determines the optical fiber transmission lines 220 on which the route mask setting section 124 is to set the route mask (mask target optical fiber transmission line), based on the collecting value obtained by the use rate collecting section 131.

The optical path design section 120-3 stores, in the data base section 110, the route of the optical path to accommodate the demand traffic, the wavelength slot number, and the accommodation wavelength slot number, and gives notice to the node device 210 through the device setting notification section 140.

Figure 15:
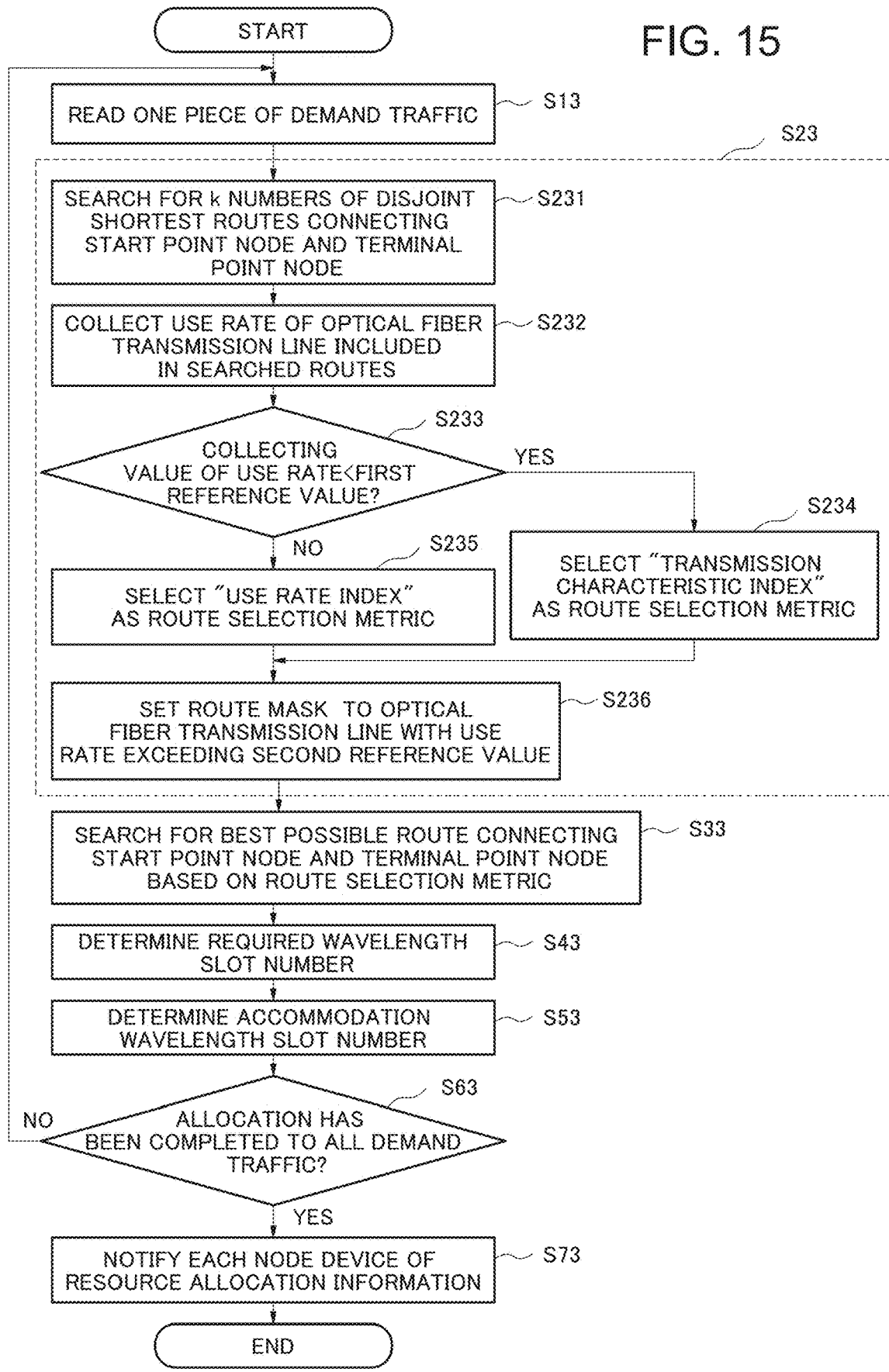
FIG. 15 is a flowchart to explain an operation of the optical path controller and a method of controlling optical path according to the fifth example embodiment of the present invention.

Next, the operation of the optical path controller 100-3 and the method of controlling optical path according to the present example embodiment will be described. FIG. 15 illustrates a flowchart to explain the operation of the optical path controller 100-3 and the method of controlling optical path according to the present example embodiment.

The optical path controller 100-3, first, reads one piece of the demand traffic (Step S13), and determines a route selection metric (route selection index) that is an index used for searching for a route of the optical path to accommodate the demand traffic (Step S23).

In the step for determining the route selection metric (Step S23), first, the route selection section 121 searches for k numbers of disjoint shortest routes connecting the start point node and the terminal point node of the demand traffic in order to determine the optical fiber transmission line 220 to be targeted at collecting the use rate. In this case, the route selection section 121 searches for the shortest route with reference to the physical topology DB 112. The collecting area limiting section 133 limits the target for collecting the use rate to the optical fiber transmission line on the k numbers of disjoint shortest routes (searched routes) of the search results (Step S231). Subsequently, the use rate collecting section 131 collects the use rate of the optical fiber transmission line 220 included in the searched routes (Step S232).

The route selection metric judgment section 132 compares the collecting value of the use rate with a first reference value (Step S233). Here, "the reference value" used in the second example embodiment can be used as the first reference value. It is assumed that the first reference value is set in advance by a network operator.

If the collecting value of the use rate is less than the first reference value (Step S233/YES), the route selection metric judgment section 132 selects "the transmission characteristic index" as the route selection metric (Step S234). If the collecting value of the use rate is equal to or larger than the first reference value, the route selection metric judgment section 132 selects "the use rate index" as the route selection metric (Step S235).

In addition, the route mask judgment section 134 compares, with respect to each optical fiber transmission line 220 to be targeted at collecting the use rate, the use rate of each optical fiber transmission line 220 with a predetermined second reference value (route mask reference value). It is assumed that the second reference value is also set in advance by a network operator. Then the route mask judgment section 134 selects, as the mask target optical fiber transmission line, an optical fiber transmission line with the use rate exceeding the second reference value. The route mask setting section 124 sets the route mask to the route including the mask target optical fiber transmission line (Step S236).

Subsequently, the route selection section 121 searches for the best possible route connecting the start point node and the terminal point node of the demand traffic based on the route selection metric determined by the route selection metric determination section 130-3 (Step S33). In this case, the route selection section 121 excludes, from the search target, the route including the mask target optical fiber transmission line to which the route mask has been set.

The required wavelength slot number determination section 122 determines the required wavelength slot number to be required to open an optical path in the best possible route (Step S43). The accommodation wavelength slot number determination section 123 searches for an unused wavelength slot to accommodate an optical path with the required wavelength slot number with regard to the optical fiber transmission line 220 on the best possible route, and determines the accommodation wavelength slot number to specify the unused wavelength slot (Step S53).

If the allocation of the optical paths has been completed to all the demand traffic (Step S63/YES), the optical path design section 120-3 notifies each node device 210 of resource allocation information through the device setting notification section 140 (Step S73). The resource allocation information contains the route of the optical paths, the required wavelength slot number, the accommodation wavelength slot number, and the like. The above-described steps have completed the operation to open the optical path.

If the allocation of the optical paths has not been completed to all the demand traffic (Step S63/NO), subsequent one piece of the demand traffic is read (Step S13), and the above-mentioned steps are repeated.

Figure 16A:
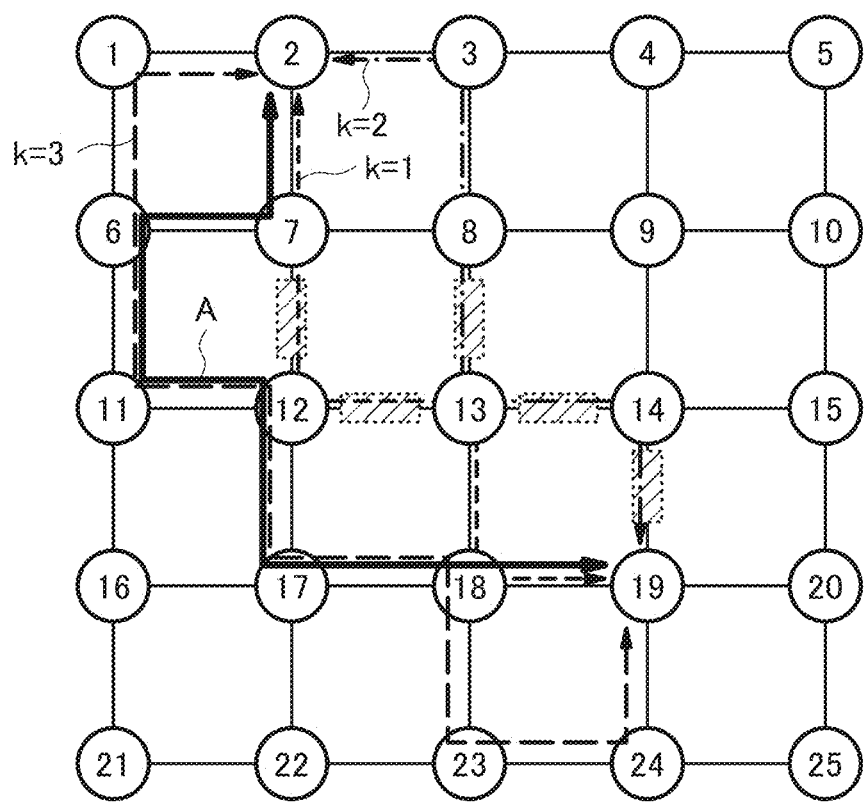
FIG. 16A is a diagram schematically illustrating a configuration of a mesh optical network to explain the operation of the optical path controller and the method of controlling optical path according to the fifth example embodiment of the present invention.

Next, with reference to FIG. 16A and FIG. 16B, the operation of the optical path controller 100-3 and the method of controlling optical path according to the present example embodiment will be described more specifically. It will be described as an example to open an optical path to accommodate demand traffic between two node devices E2 and E19 in the mesh optical network illustrated in FIG. 16A. It is assumed that the first reference value and the second reference value are determined by a network operator, and the first reference value is set at 70%, and the second reference value is set at 60%, in this case.

As a result of searching for the k-th shortest disjoint routes with K=3 by the route selection section 121, the first shortest route (k=1), the second shortest route (k=2), and the third shortest route (k=3) are selected respectively as follows (see FIG. 16A).

The first shortest route 1: E2-E7, E7-E12, E12-E13, E13-E18, E18-E19
The second shortest route 2: E2-E3, E3-E8, E8-E13, E13-E14, E14-E19
The third shortest route 3: E1-E2, E1-E6, E6-E11, E11-E12, E12-E17, E17-E18, E18-E23, E23-E24, E19-E24

Figure 16B:
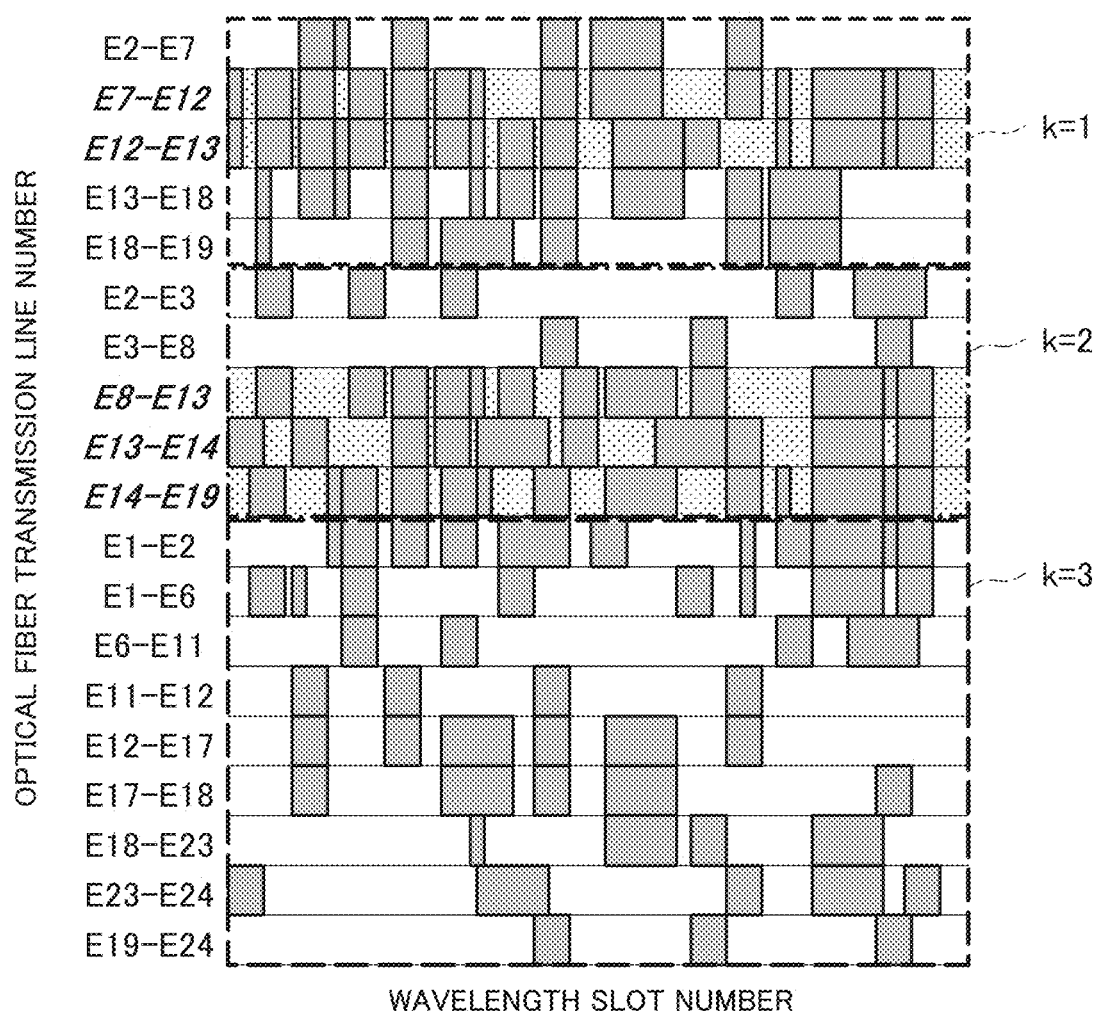
FIG. 16B is a diagram schematically illustrating usage conditions of an optical frequency band in each optical fiber transmission line to explain the operation of the optical path controller and the method of controlling optical path according to the fifth example embodiment of the present invention.

FIG. 16B schematically illustrates usage conditions of the optical frequency bands in each optical fiber transmission line described above.

The collecting area limiting section 133 limits the target for collecting the use rate to the optical fiber transmission line 220 included in the above-described three routes. As a result of collecting the use rates of the above-described three routes by the use rate collecting section 131, the collecting value of the use rate is equal to 71%. Here, the collecting value of the use rate is a ratio of an allocated wavelength slot number to an allocated wavelength slot total number, in the optical fiber transmission line with a maximum allocated wavelength slot total number. Because the collecting value of the use rate exceeds the first reference value (70%), the route selection metric judgment section 132 determines to adopt "the use rate index" as the route selection metric.

In addition, the route mask judgment section 134 selects, as the mask target optical fiber transmission line, five optical fiber transmission lines E7-E12, E8-E13, E12-E13, E13-E14, and E14-E19 that exceed the second reference value (60%). The route mask setting section 124 sets the route masks to the routes including the above-described five optical fiber transmission lines (the hatched areas in FIG. 16A). In this case, the route selection section 121 excludes, from the route search target, the routes including the above-described five optical fiber transmission lines to which the route masks have been set. As a result of the route search, the route selection section 121 selects the following route A as the best possible route, and the optical path is allocated to the best possible route.

The route A: E2-E7, E6-E7, E6-E11, E11-E12, E12-E17, E17-E18, E18-E19

As described above, the optical path controller 100-3 and the method of controlling optical path according to the present example embodiment are configured to determine the route selection metric based on the use rate of the optical frequency band in the optical fiber transmission line. As a result, in the elastic optical network, it is possible to prevent a probability of opening an optical path from decreasing, with improving frequency utilization efficiency. They are also configured to limit the object of collecting the use rate to the optical fiber transmission line that can be selected as the optical path route to accommodate the demand traffic, for example, the optical fiber transmission line included in the k-th shortest routes. This makes it possible to select an optimum route selection metric depending on the demand traffic, which also enables the success probability in allocating optical paths to increase.

In addition, the optical path controller 100-3 and the method of controlling optical path according to the present example embodiment are configured to exclude, from the search target, the route including the optical fiber transmission line with the use rate exceeding the predetermined threshold value. This makes it possible to select a route that has a great chance of success in allocation of the optical path; consequently, the optical path setting rejection rate can be reduced. Therefore, it is possible to further increase the probability of opening an optical path.

Sixth Example Embodiment

Figure 17:
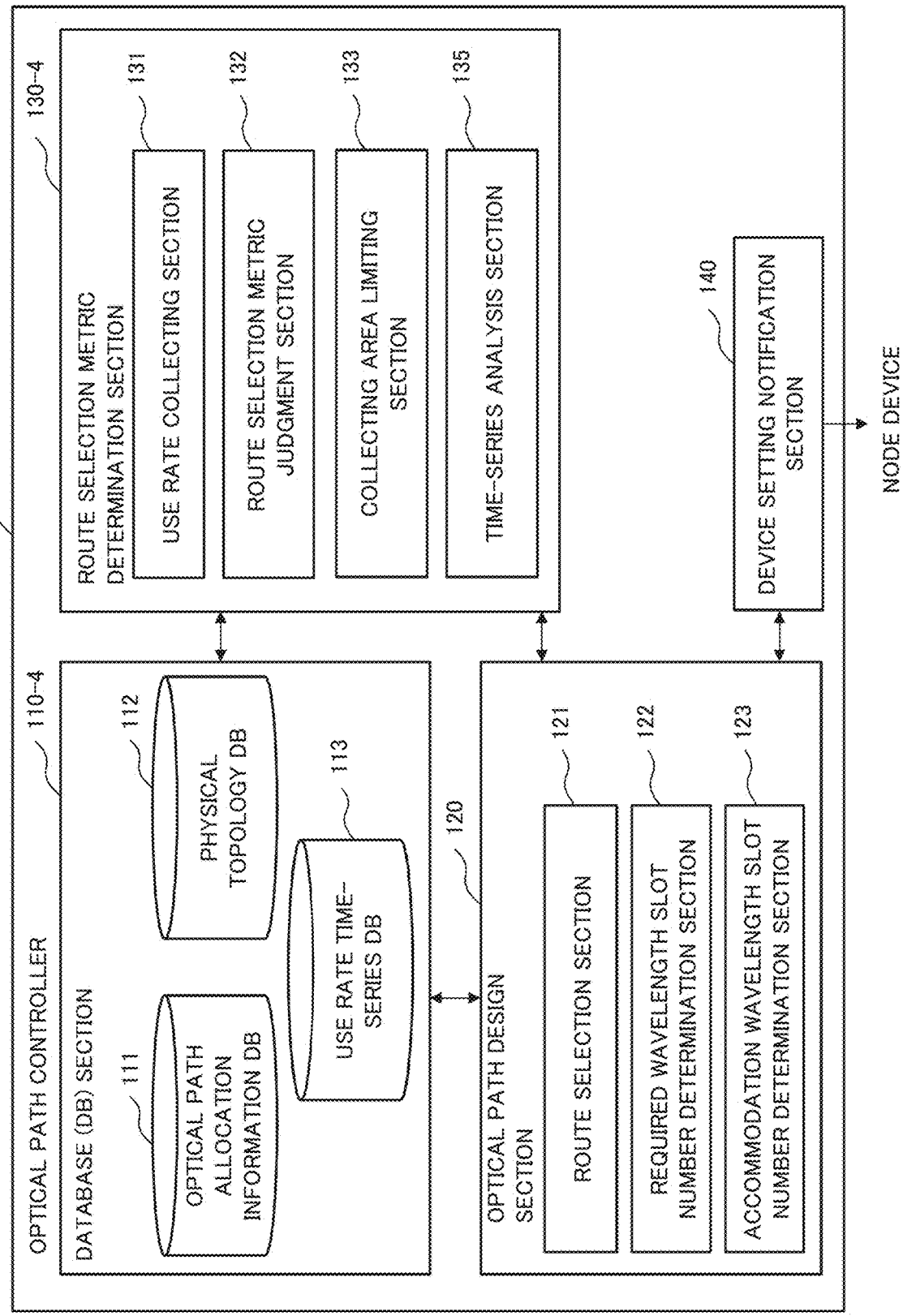
FIG. 17 is a block diagram illustrating a configuration of an optical path controller according to a sixth example embodiment of the present invention.

Next, a sixth example embodiment of the present invention will be described. FIG. 17 illustrates a configuration of an optical path controller 100-4 according to the present example embodiment. The optical path controller 100-4 includes a database (DB) section 110-4, the optical path design section 120, a route selection metric determination section 130-4, and the device setting notification section 140.

The data base section 110-4 includes a use rate time-series DB 113 in addition to the optical path allocation information DB 111 and the physical topology DB 112. The use rate time-series DB 113 stores time-series data that are time-shifts of the use rate.

The optical path design section 120 includes the route selection section 121, the required wavelength slot number determination section 122, and the accommodation wavelength slot number determination section 123. The route selection section 121 selects, with reference to the physical topology DB 112, a route with the minimum value of the route selection metric as the route connecting the start point node and the terminal point node of the demand traffic. The required wavelength slot number determination section 122 determines the required wavelength slot number depending on the transmission characteristics of the route selected by the route selection section 121. The accommodation wavelength slot number determination section 123 determines the accommodation wavelength slot number to specify the unused wavelength slot corresponding to the required wavelength slot number.

The route selection metric determination section 130-4 includes a time-series analysis section (time-series analysis means) 135 in addition to the use rate collecting section 131, the route selection metric judgment section 132, and the collecting area limiting section 133.

The collecting area limiting section 133 limits the optical fiber transmission line to be targeted for collecting the use rate of the optical frequency band, to the optical fiber transmission line that can be selected as the optical path route. The use rate collecting section 131 collects the use rate of the optical fiber transmission line limited by the collecting area limiting section 133, and causes the use rate time-series DB 113 to store the collected use rate.

The time-series analysis section 135 (time-series analysis means) calculates, from the time-shifts of the use rate, a use rate time variation representing temporal variation in the use rate. Specifically, the time-series analysis section 135 analyzes time-series data of time-shifts of the use rate, with reference to the use rate time-series DB 113, for example. The time-series analysis section 135 can be configured to calculate a time-averaged value of an increase in the use rate as the use rate time variation.

The route selection metric judgment section 132 determines the route selection metric to be used by the route selection section 121, based on the results of comparison of the collecting value of the use rate at the current time with a first reference value, and further comparison of the incremental value of the use rate with a third reference value.

Here, the first reference value and the third reference value can be set in advance by a network operator or the like.

The optical path design section 120 notifies the node devices 210 through the device setting notification section 140 of the route of the optical paths to accommodate the demand traffic, the wavelength slot number, and the accommodation wavelength slot number.

Figure 18:
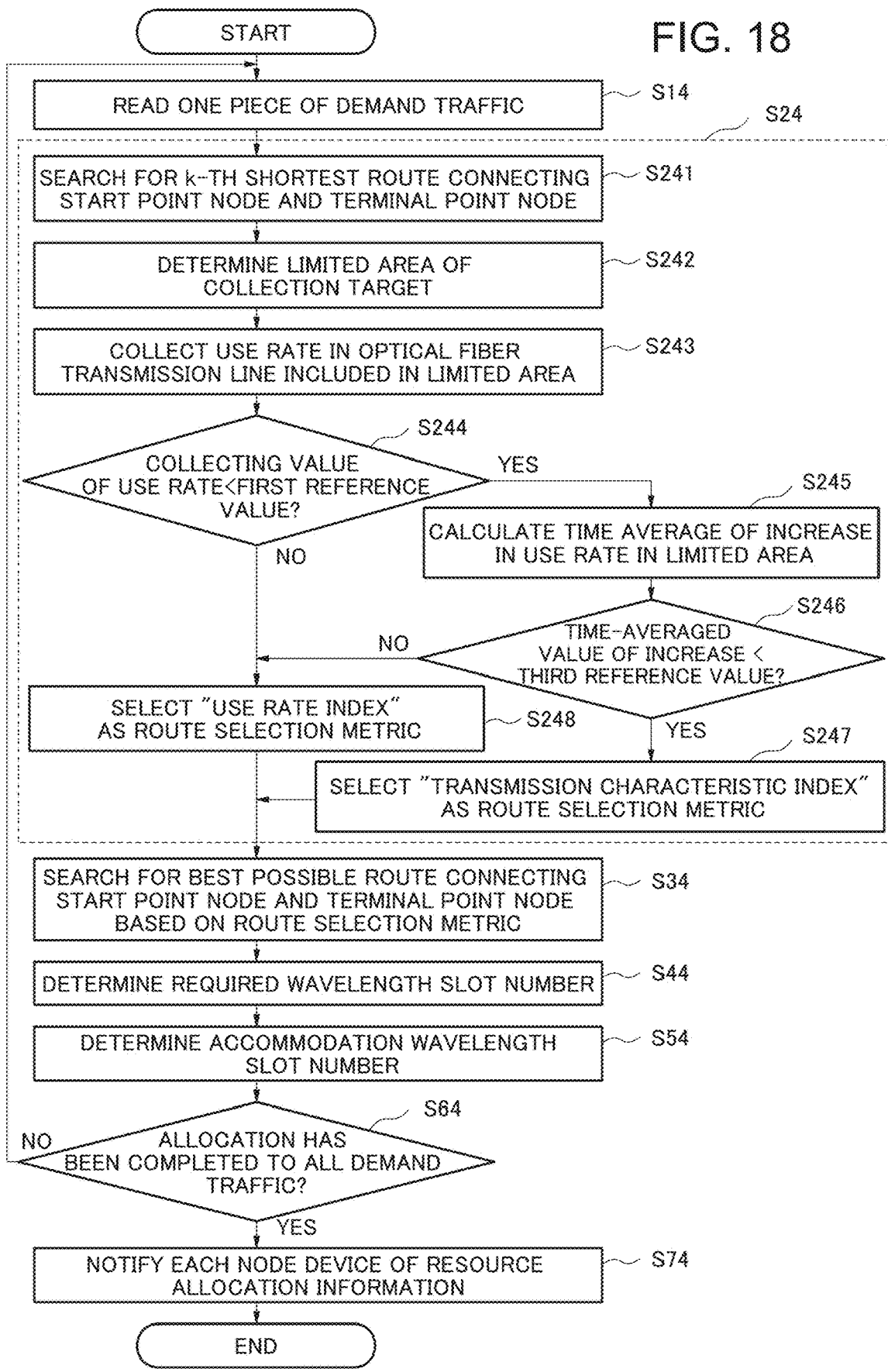
FIG. 18 is a flowchart to explain an operation of the optical path controller and a method of controlling optical path according to the sixth example embodiment of the present invention.

Next, the operation of the optical path controller 100-4 and the method of controlling optical path according to the present example embodiment will be described. FIG. 18 illustrates a flowchart to explain the operation of the optical path controller 100-4 and the method of controlling optical path according to the present example embodiment.

The optical path controller 100-4, first, reads one piece of the demand traffic (Step S14), and determines a route selection metric (route selection index) that is an index used for searching for a route of the optical path to accommodate the demand traffic (Step S24).

In the step for determining the route selection metric (Step S24), first, the route selection section 121 searches for the k-th shortest route connecting the start point node and the terminal point node of the demand traffic (Step S241). The collecting area limiting section 133 limits the optical fiber transmission line 220 to be targeted for collecting the use rate, and determines an area (limited area) including the optical fiber transmission line 220 to be targeted at collection (Step S242). Subsequently, the use rate collecting section 131 collects the use rate in the optical fiber transmission line 220 included in the limited area (Step S243), and causes the use rate time-series DB 113 to store the collected use rate.

Next, the route selection metric judgment section 132 compares the collecting value of the use rate with a first reference value (Step S244). Here, "the reference value" used in the second example embodiment can be used as the first reference value.

If the collecting value of the use rate is less than the first reference value (Step S244/YES), the time-series analysis section 135 calculates a time average of an increase in the use rate with reference to the use rate time-series DB 113 (Step S245). One example of the time average of the increase in the use rate is described below. In the following formula, "u" represents the use rate, "$t_n$" represents the current time, and "M" represents the number of data.

$$\frac{1}{M}\sum_{k=0}^{M-1}\frac{u(t_{n-k})-u(t_{n-1-k})}{t_{n-k}-t_{n-1-k}}$$

The route selection metric judgment section 132 compares the above-mentioned time-averaged value of the increase in the use rate with a predetermined third reference value (Step S246). Here, the third reference value can be determined based on the time-series data of the use rate regarding a plurality of optical paths failing in allocation to the wavelength slots before receiving the traffic demand. Specifically, it is possible to use, as the third reference value, any one of an average value, a minimum value, and a maximum value of the time-series data on the use rate in the optical fiber transmission lines included in the route of the optical path failing in the allocation, for example.

If the time-averaged value of the increase in the use rate is less than the third reference value (Step S246/YES), the route selection metric judgment section 132 selects "the transmission characteristic index" as the route selection metric (Step S247).

If the collecting value of the use rate is equal to or larger than the first reference value (Step S244/NO), or the time-averaged value of the increase in the use rate is equal to or larger than the third reference value (Step S246/NO), the route selection metric judgment section 132 selects "the use rate index" as the route selection metric (Step S248).

Following the step for determining the route selection metric (Step S24), the route selection section 121 searches for the best possible route connecting the start point node and the terminal point node of the demand traffic based on the route selection metric determined by the route selection metric determination section 130-4 (Step S34). In this case, the route selection section 121 searches for the best possible route with reference to the physical topology DB 112.

The required wavelength slot number determination section 122 determines the required wavelength slot number to be required to open an optical path in the best possible route (Step S44). The accommodation wavelength slot number determination section 123 searches for an unused wavelength slot to accommodate an optical path with the required wavelength slot number with regard to the optical fiber transmission line 220 on the best possible route, and determines the accommodation wavelength slot number to specify the unused wavelength slot (Step S54).

If the allocation of the optical paths has been completed to all the demand traffic (Step S64/YES), the optical path design section 120 notifies each node device 210 of resource allocation information through the device setting notification section 140 (Step S74). The resource allocation information contains the route of the optical path, the required wavelength slot number, the accommodation wavelength slot number, and the like. The above-described steps have completed the operation to open the optical path.

If the allocation of the optical paths has not been completed to all the demand traffic (Step S64/NO), subsequent one piece of the demand traffic is read (Step S14), and the above-mentioned steps are repeated.

Figure 19A:
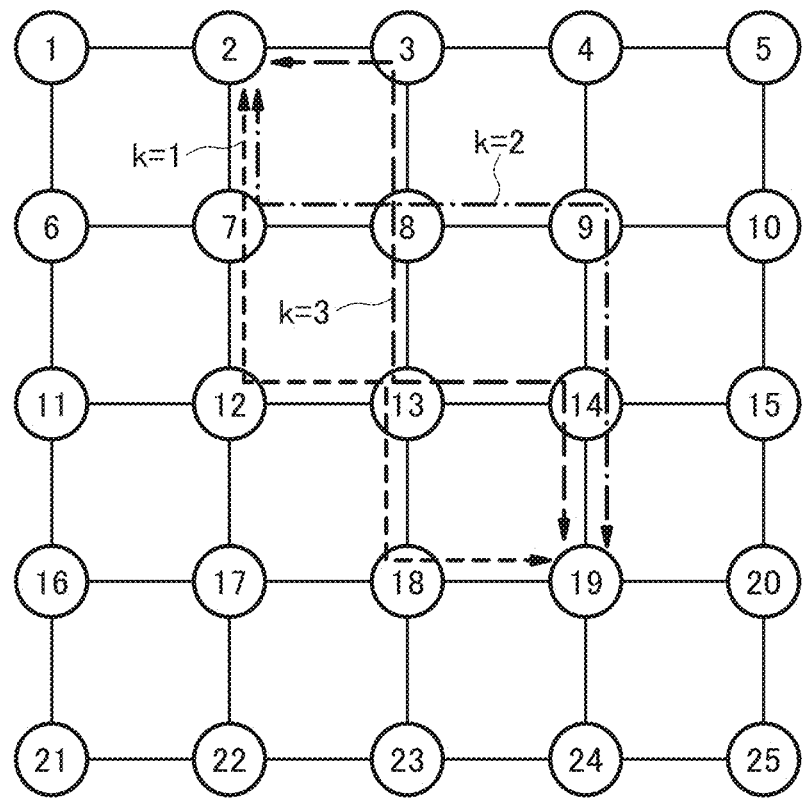
FIG. 19A is a diagram schematically illustrating a configuration of a mesh optical network to explain the operation of the optical path controller and the method of controlling optical path according to the sixth example embodiment of the present invention.

Next, with reference to FIG. 19A, FIG. 19B, and FIG. 19C, the operation of the optical path controller 100-4 and the method of controlling optical path according to the present example embodiment will be described more specifically. It will be described as an example to open an optical path to accommodate demand traffic between two node devices E2 and E19 in the mesh optical network illustrated in FIG. 19A. It is assumed that the first reference value and the third reference value are set in advance, and the first reference value is set at 70%, and the third reference value is set at 20% per unit time, in this case.

As a result of searching for the k-th shortest routes with K=3 by the route selection section 121, the first shortest route (k=1), the second shortest route (k=2), and the third shortest route (k=3) are selected respectively as follows (see FIG. 19A).

The first shortest route: E2-E7, E7-E12, E12-E13, E13-E18, E18-E19

The second shortest route: E2-E7, E7-E8, E8-E9, E9-E14, E14-E19

The third shortest route: E2-E3, E3-E8, E8-E13, E13-E14, E14-E19

Figure 19B:
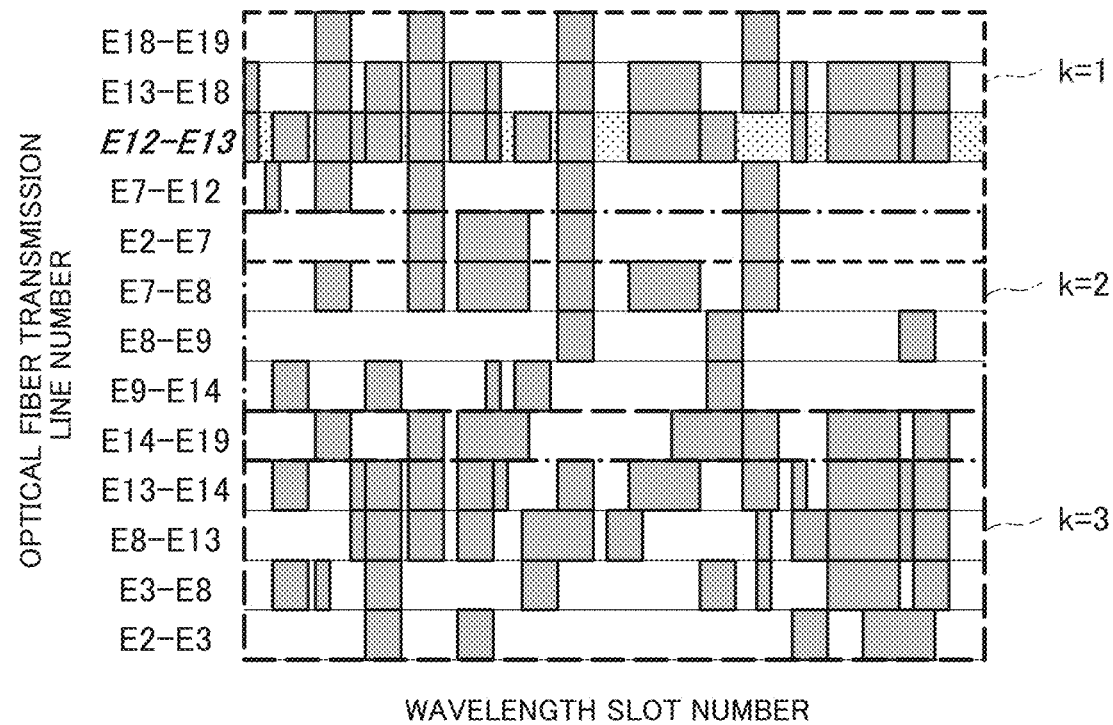
FIG. 19B is a diagram schematically illustrating usage conditions of an optical frequency band in each optical fiber transmission line to explain the operation of the optical path controller and the method of controlling optical path according to the sixth example embodiment of the present invention.

FIG. 19B schematically illustrates usage conditions of the optical frequency bands in each optical fiber transmission line described above.

The collecting area limiting section 133 limits the target for collecting the use rate to the optical fiber transmission line 220 included in the above-described three routes. As a result of collecting the use rates of the above-described three routes by the use rate collecting section 131, the collecting value of the use rate is equal to 60% in the optical fiber transmission line E12-E13. Here, the collecting value of the use rate is the ratio of the allocated wavelength slot number to the allocated wavelength slot total number, in the optical fiber transmission line with the maximum allocated wavelength slot total number. Because the collecting value of the use rate falls below the first reference value (70%), the time-series analysis section 135 calculates the time average of the increase in the use rate with reference to the use rate time-series DB 113.

As a result of calculating the time average of the increase in the use rate by the time-series analysis section 135, the time average of the increase in the use rate in the optical fiber transmission line E12-E13 is equal to 40% per unit time. FIG. 19C schematically illustrates time variation in the use rate in the optical fiber transmission line E12-E13. Because the time average of the increase in the use rate in this case exceeds 20% at which the third reference value has been set, the route selection metric judgment section 132 selects "the use rate index" as the route selection metric. Consequently, the optical path design section 120 allocates the optical path to the second shortest route (k=2) with the minimum use rate.

Figure 19C:
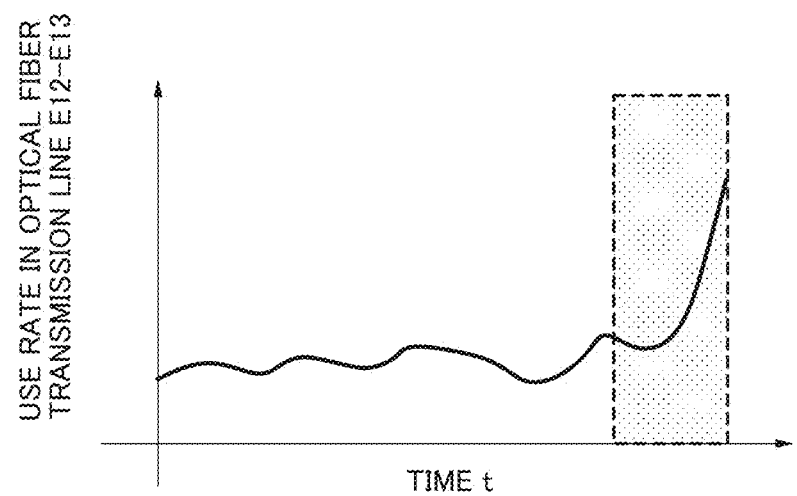
FIG. 19C is a diagram schematically illustrating time variation in a use rate in an optical fiber transmission line to explain the operation of the optical path controller and the method of controlling optical path according to the sixth example embodiment of the present invention.

According to the optical path controller 100-4 and the method of controlling optical path of the present example embodiment, the above-mentioned configurations make it possible to set the optical path with the exception of a route in which the use rate rapidly increases temporally as illustrated by the shaded area in FIG. 19C. Because the route in which the use rate rapidly increases temporally has a risk of flooding the lines due to congestion, the optical path setting rejection rate can be further decreased by avoiding such route.

As described above, the optical path controller 100-4 and the method of controlling optical path according to the present example embodiment are configured to determine the route selection metric based on the use rate of the optical frequency band in the optical fiber transmission line. As a result, in the elastic optical network, it is possible to prevent a probability of opening an optical path from decreasing, with improving frequency utilization efficiency. They are also configured to limit the object of collecting the use rate to the optical fiber transmission line that can be selected as the optical path route to accommodate the demand traffic, for example, the optical fiber transmission line included in the k-th shortest routes. This makes it possible to select an optimum route selection metric depending on the demand traffic, which also enables the success probability in allocating optical paths to increase.

In addition, according to the optical path controller 100-4 and the method of controlling optical path of the present example embodiment, it is possible to set the optical path with the exception of a route in which the use rate rapidly increases temporally. This enables the optical path setting rejection rate to decrease further, and the frequency utilization efficiency to improve.

The whole or part of the example embodiments disclosed above can be described as, but not limited to, the following supplementary notes.

(Supplementary note 1) An optical path controller, comprising: route selection means for searching for a route candidate being a candidate for a route to accommodate an optical path, and selecting a best possible route with a minimum route selection index serving as an index for route search; use rate collecting means for collecting a use rate serving as an index to indicate a usage condition of an optical frequency band in an optical fiber transmission line included in the route candidate; and route selection index judgment means for determining the route selection index based on the use rate.

(Supplementary note 2) The optical path controller according to Supplementary note 1, wherein the route selection index judgment means selects any one of a transmission characteristic index and a use rate index as the route selection index, based on a result obtained by comparing a value acquired by collecting the use rate with a predetermined reference value, the transmission characteristic index is an index indicating transmission characteristics of the route candidate, and the use rate index is an index based on the use rate.

(Supplementary note 3) The optical path controller according to Supplementary note 2, wherein the route selection index judgment means uses, as the predetermined reference value, the use rate for an optical path for which an optical frequency band fails to be reserved in an optical fiber transmission line included in the best possible route.

(Supplementary note 4) The optical path controller according to any one of Supplementary notes 1, 2, and 3, further comprising collecting area limiting means for selecting a limited route candidate limiting scope of the route candidate, and limiting an optical fiber transmission line to be targeted for which the use rate collecting means collects the use rate, to scope included in the limited route candidate, wherein the route selection means selects the best possible route with the route selection index being at a minimum from among the limited route candidates, and the use rate collecting means collects the use rate of the optical fiber transmission line included in the limited route candidate.

(Supplementary note 5) The optical path controller according to Supplementary note 4, wherein the collecting area limiting means selects, from among the route candidates, a plurality of route candidates including a best possible route candidate with best possible transmission characteristics, as the limited route candidate.

(Supplementary note 6) The optical path controller according to Supplementary note 4 or 5, wherein the collecting area limiting means selects, from among the route candidates, a plurality of independent route candidates independent of each other, as the limited route candidate.

(Supplementary note 7) The optical path controller according to any one of Supplementary notes 1, 2, 3, 4, 5, and 6, further comprising route mask judgment means for selecting, as a mask target optical fiber transmission line, the optical fiber transmission line with the use rate exceeding a predetermined route mask reference value, and route mask setting means for setting a route mask to a route including the mask target optical fiber transmission line, wherein the route selection means searches for the route candidate excluding a route to which the route mask is set.

(Supplementary note 8) The optical path controller according to any one of Supplementary notes 1, 2, 3, 4, 5, 6, and 7, further comprising time-series analysis means for calculating, from a time-shift of the use rate, a use rate time variation representing temporal variation in the use rate, wherein the route selection index judgment means determines the route selection index based on the use rate time variation.

(Supplementary note 9) The optical path controller according to Supplementary note 2, wherein the transmission characteristic index is any one of a route length, a hop count, a received optical signal-to-noise ratio, and a delay amount.

(Supplementary note 10) The optical path controller according to Supplementary note 2, wherein the use rate index is any one of a fragmented slot number, a fragmented slot area number, an occupied wavelength slot number, an allocated optical path number, an occupied slot number of a high-priority optical path, an allocated high-priority optical path number, an accommodation traffic capacity, and an accommodation traffic request number.

(Supplementary note 11) The optical path controller according to Supplementary note 2, wherein a value obtained by collecting the use rate is any one of an average value, a maximum value, a minimum value, a standard deviation, and a variance value, of the use rate.

(Supplementary note 12) A method of controlling optical path, comprising: searching for a route candidate being a candidate for a route to accommodate an optical path, and selecting a best possible route with a minimum route selection index serving as an index for route search; collecting a use rate serving as an index to indicate a usage condition of an optical frequency band in an optical fiber transmission line included in the route candidate; and determining the route selection index based on the use rate.

(Supplementary note 13) The method of controlling optical path according to Supplementary note 12, wherein the determining of the route selection index includes selecting any one of a transmission characteristic index and a use rate index as the route selection index, based on a result obtained by comparing a value acquired by collecting the use rate with a predetermined reference value, the transmission characteristic index is an index indicating transmission characteristics of the route candidate, and the use rate index is an index based on the use rate.

(Supplementary note 14) The method of controlling optical path according to Supplementary note 13, wherein the determining of the route selection index includes using, as the predetermined reference value, the use rate for an optical path for which an optical frequency band fails to be reserved in an optical fiber transmission line included in the best possible route.

(Supplementary note 15) The method of controlling optical path according to any one of Supplementary notes 12, 13, and 14, further comprising selecting a limited route candidate limiting scope of the route candidate, and limiting the optical fiber transmission line to be targeted for collecting the use rate, to scope included in the limited route candidate, wherein the selecting of the best possible route includes selecting the best possible route with the route selection index being at a minimum from among the limited route candidates, and the collecting of the use rate includes collecting the use rate of the optical fiber transmission line included in the limited route candidate.

(Supplementary note 16) The method of controlling optical path according to Supplementary note 15, wherein the selecting of the limited route candidate includes selecting, from among the route candidates, a plurality of route candidates including a best possible route candidate with best possible transmission characteristics, as the limited route candidate.

(Supplementary note 17) The method of controlling optical path according to Supplementary note 15 or 16, wherein the selecting of the limited route candidate includes selecting, from among the route candidates, a plurality of independent route candidates independent of each other, as the limited route candidate.

(Supplementary note 18) The method of controlling optical path according to any one of Supplementary notes 12, 13, 14, 15, 16, and 17, further comprising selecting, as a mask target optical fiber transmission line, the optical fiber transmission line with the use rate exceeding a predetermined route mask reference value, and setting a route mask to a route including the mask target optical fiber transmission line, wherein the selecting of the best possible route includes searching for the route candidate excluding a route to which the route mask is set.

(Supplementary note 19) The method of controlling optical path according to any one of Supplementary notes 12, 13, 14, 15, 16, 17, and 18, further comprising calculating, from a time-shift of the use rate, a use rate time variation representing temporal variation in the use rate, wherein the determining of the route selection index includes determining the route selection index based on the use rate time variation.

(Supplementary note 20) A computer-readable storage medium storing a program that, when excluded, causes a computer to function as: route selection means for searching for a route candidate being a candidate for a route to accommodate an optical path, and selecting a best possible route with a minimum route selection index serving as an index for route search; use rate collecting means for collecting a use rate serving as an index to indicate a usage condition of an optical frequency band in an optical fiber transmission line included in the route candidate; and route selection index judgment means for determining the route selection index based on the use rate.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

1100 Route selection section
1200 Use rate collecting section
1300 Route selection index judgment section
1000, 100, 100-1, 100-2, 100-3, 100-4 Optical path controller
110, 110-4 Database (DB) section
111 Optical path allocation information DB
112 Physical topology DB
113 Use rate time-series DB
120, 120-3 Optical path design section
121 Route selection section
122 Required wavelength slot number determination section
123 Accommodation wavelength slot number determination section
124 Route mask setting section
130, 130-2, 130-3, 130-4 Route selection metric determination section
131 Use rate collecting section
132 Route selection metric judgment section
133 Collecting area limiting section
134 Route mask judgment section
135 Time-series analysis section
140 Device setting notification section
150 Reference value calculation section
151 Optical path extraction section
152 On-failure use rate collecting section
200 Optical network
210, 210-1 to 210-5 Node device
211 Device setting receiving section
212 Node device control section
213 Variable optical path transceiving section
214 Optical path switching section 220, 220-1 to 220-7 Optical fiber transmission line
10 Optical communication system

The invention claimed is:

1. An optical path controller, comprising:
a route selection section configured to search for a route candidate being a candidate for a route to accommodate an optical path, and select a best possible route with a minimum route selection index serving as an index for route search;
a use rate collecting section configured to collect a use rate serving as an index to indicate a usage condition of an optical frequency band in an optical fiber transmission line included in the route candidate; and
a route selection index judgment section configured to determine the route selection index based on the use rate,
wherein the route selection index judgment section selects any one of a transmission characteristic index and a use rate index as the route selection index, based on a result obtained by comparing a value acquired by collecting the use rate with a predetermined reference value, the transmission characteristic index is an index indicating transmission characteristics of the route candidate, and the use rate index is an index based on the use rate.

2. The optical path controller according to claim 1, wherein
the route selection index judgment section uses, as the predetermined reference value, the use rate for an optical path for which an optical frequency band fails to be reserved in an optical fiber transmission line included in the best possible route.

3. The optical path controller according to claim 1, further comprising
a collecting area limiting section configured to select a limited route candidate limiting scope of the route candidate, and limit an optical fiber transmission line to be targeted for which the use rate collecting section collects the use rate, to scope included in the limited route candidate, wherein
the route selection section selects the best possible route with the route selection index being at a minimum from among the limited route candidates, and
the use rate collecting section collects the use rate of the optical fiber transmission line included in the limited route candidate.

4. The optical path controller according to claim 3, wherein
the collecting area limiting section selects, from among the route candidates, a plurality of route candidates including a best possible route candidate with best possible transmission characteristics, as the limited route candidate.

5. The optical path controller according to claim 3, wherein
the collecting area limiting section selects, from among the route candidates, a plurality of independent route candidates independent of each other, as the limited route candidate.

6. The optical path controller according to claim 1, further comprising
a route mask judgment section configured to select, as a mask target optical fiber transmission line, the optical fiber transmission line with the use rate exceeding a predetermined route mask reference value, and
a route mask setting section configured to set a route mask to a route including the mask target optical fiber transmission line, wherein
the route selection section searches for the route candidate excluding a route to which the route mask is set.

7. The optical path controller according to claim 1, further comprising
a time-series analysis section configured to calculate, from a time-shift of the use rate, a use rate time variation representing temporal variation in the use rate, wherein
the route selection index judgment section determines the route selection index based on the use rate time variation.

8. The optical path controller according to claim 1, wherein
the transmission characteristic index is any one of a route length, a hop count, a received optical signal-to-noise ratio, and a delay amount.

9. The optical path controller according to claim 1, wherein
the use rate index is any one of a fragmented slot number, a fragmented slot area number, an occupied wavelength slot number, an allocated optical path number, an occupied slot number of a high-priority optical path, an allocated high-priority optical path number, an accommodation traffic capacity, and an accommodation traffic request number.

10. The optical path controller according to claim 1, wherein
a value obtained by collecting the use rate is any one of an average value, a maximum value, a minimum value, a standard deviation, and a variance value, of the use rate.

11. A method of controlling optical path, comprising:
searching for a route candidate being a candidate for a route to accommodate an optical path, and selecting a best possible route with a minimum route selection index serving as an index for route search;
collecting a use rate serving as an index to indicate a usage condition of an optical frequency band in an optical fiber transmission line included in the route candidate; and
determining the route selection index based on the use rate,
wherein the determining of the route selection index includes selecting any one of a transmission characteristic index and a use rate index as the route selection index, based on a result obtained by comparing a value acquired by collecting the use rate with a predetermined reference value, the transmission characteristic index is an index indicating transmission characteristics of the route candidate, and the use rate index is an index based on the use rate.

12. The method of controlling optical path according to claim 11, wherein
the determining of the route selection index includes using, as the predetermined reference value, the use rate for an optical path for which an optical frequency band fails to be reserved in an optical fiber transmission line included in the best possible route.

13. The method of controlling optical path according to claim 11, further comprising
selecting a limited route candidate limiting scope of the route candidate, and limiting the optical fiber transmission line to be targeted for collecting the use rate, to scope included in the limited route candidate, wherein the selecting of the best possible route includes selecting the best possible route with the route selection index being at a minimum from among the limited route candidates, and the collecting of the use rate includes collecting the use rate of the optical fiber transmission line included in the limited route candidate.

14. The method of controlling optical path according to claim 13, wherein the selecting of the limited route candidate includes selecting, from among the route candidates, a plurality of route candidates including a best possible route candidate with best possible transmission characteristics, as the limited route candidate.

15. The method of controlling optical path according to claim 13, wherein the selecting of the limited route candidate includes selecting, from among the route candidates, a plurality of independent route candidates independent of each other, as the limited route candidate.

16. The method of controlling optical path according to claim 11, further comprising selecting, as a mask target optical fiber transmission line, the optical fiber transmission line with the use rate exceeding a predetermined route mask reference value, and setting a route mask to a route including the mask target optical fiber transmission line, wherein the selecting of the best possible route includes searching for the route candidate excluding a route to which the route mask is set.

17. The method of controlling optical path according to claim 11, further comprising calculating, from a time-shift of the use rate, a use rate time variation representing temporal variation in the use rate, wherein the determining of the route selection index includes determining the route selection index based on the use rate time variation.

* * * * *